United States Patent
Rai et al.

(10) Patent No.: US 11,250,343 B2
(45) Date of Patent: *Feb. 15, 2022

(54) MACHINE LEARNING ANOMALY DETECTION

(71) Applicant: SAP SE, Walldorf (DE)

(72) Inventors: Ramprasad Rai, Palo Alto, CA (US); Timo Hoyer, South San Francisco, CA (US); Dirk Wodtke, Aptos, CA (US); Ramshankar Venkatasubramanian, Santa Clara, CA (US)

(73) Assignee: SAP SE, Walldorf (DE)

( * ) Notice: Subject to any disclaimer, the term of this patent is extended or adjusted under 35 U.S.C. 154(b) by 920 days.

This patent is subject to a terminal disclaimer.

(21) Appl. No.: 15/617,498

(22) Filed: Jun. 8, 2017

(65) Prior Publication Data

US 2018/0357556 A1    Dec. 13, 2018

(51) Int. Cl.
*G06N 20/00* (2019.01)
*G06N 20/10* (2019.01)
(Continued)

(52) U.S. Cl.
CPC ............ *G06N 20/00* (2019.01); *G06F 21/552* (2013.01); *G06F 21/577* (2013.01); *G06N 20/10* (2019.01);
(Continued)

(58) Field of Classification Search
CPC ........ G06N 20/10; G06N 20/20; G06N 5/022; G06N 5/025; G06N 7/08; G06F 21/552;
(Continued)

(56) References Cited

U.S. PATENT DOCUMENTS 5,317,686 A    5/1994    Salas et al.
5,339,392 A    8/1994    Risberg et al.
(Continued)

OTHER PUBLICATIONS

Anomaly Detection in GPS Data Based on Visual Analytics (Year: 2010).*

(Continued)

*Primary Examiner* — Omar F Fernandez Rivas
*Assistant Examiner* — Em N Trieu
(74) *Attorney, Agent, or Firm* — Fish & Richardson P.C.

(57) ABSTRACT

The disclosure generally describes methods, software, and systems, including a method for machine learning anomaly detection for a set of assets. Assets are analyzed using anomaly-detection analysis and a set of anomaly-detection rules. Each asset is associated with correlated records comprising characteristics of the particular asset and characteristic of non-asset-specific signals. Each anomaly-detection rule is associated with conditions determined to be indicative of a potential anomaly. At least a subset of the assets are provided for presentation in a user interface. Each asset is identified as being in a potential anomalous or non-anomalous state based on the anomaly-detection analysis. Input is received from a user identifying at least one asset as anomalous as a non-anomalous asset. Based on the received input, at least one anomaly-detection rule is modified that was applied to identify the asset as anomalous. The modified rule is stored for future analyses.

20 Claims, 12 Drawing Sheets

(51) Int. Cl.
  *G06N 5/02* (2006.01)
  *G06Q 10/08* (2012.01)
  *G06F 21/57* (2013.01)
  *G06Q 10/10* (2012.01)
  *G06Q 50/06* (2012.01)
  *G06F 21/55* (2013.01)
  *G06F 3/0484* (2013.01)

(52) U.S. Cl.
  CPC ......... *G06Q 10/083* (2013.01); *G06Q 10/087* (2013.01); *G06Q 10/10* (2013.01); *G06Q 50/06* (2013.01); *G06F 3/0484* (2013.01); *G06N 5/022* (2013.01)

(58) Field of Classification Search
  CPC ...... G06F 21/554; G06F 21/577; G06F 21/60; G06F 21/82; G06F 3/0484; G06F 3/04842; G06F 3/061; G06F 3/0614; G06Q 10/10; G06Q 10/101; G06Q 10/083; G06Q 10/0831; G06Q 10/0832; G06Q 10/087; G06Q 20/203; G06Q 20/204; G06Q 20/206; G06Q 50/06; G06Q 50/08; G06Q 50/10; G06Q 50/163; G06Q 50/28
  USPC ............................................................ 706/1
  See application file for complete search history.

(56) References Cited

U.S. PATENT DOCUMENTS

| | | |
|---|---|---|
| 5,572,644 A | 11/1996 | Liaw et al. |
| 5,701,400 A | 12/1997 | Amado |
| 5,712,020 A | 1/1998 | Parker |
| 5,768,158 A | 6/1998 | Adler et al. |
| 5,787,001 A | 7/1998 | Dietrich, Jr. et al. |
| 5,842,180 A | 11/1998 | Khanna et al. |
| 5,890,174 A | 3/1999 | Khanna et al. |
| 6,219,050 B1 | 4/2001 | Schaffer |
| 6,738,770 B2 | 5/2004 | Gorman |
| 6,995,768 B2 | 2/2006 | Jou et al. |
| 7,171,478 B2 | 1/2007 | Lueckhoff et al. |
| 7,415,677 B2 | 8/2008 | Arend et al. |
| 7,631,276 B2 | 12/2009 | Gruen et al. |
| 7,853,465 B2 | 12/2010 | Molesky |
| 8,738,477 B2 | 5/2014 | Lefebvre et al. |
| 9,003,551 B2 | 4/2015 | Hoyer |
| 9,251,472 B1 | 2/2016 | Linowes |
| 10,459,827 B1 | 10/2019 | Aghdaie |
| 2002/0046245 A1 | 4/2002 | Hillar et al. |
| 2003/0071814 A1 | 4/2003 | Jou et al. |
| 2003/0225466 A1 | 12/2003 | Yulevitch et al. |
| 2003/0227489 A1 | 12/2003 | Arend et al. |
| 2004/0138935 A1 | 7/2004 | Johnson et al. |
| 2005/0015379 A1 | 1/2005 | Aureglia et al. |
| 2005/0081141 A1 | 4/2005 | Jonsson |
| 2006/0028471 A1 | 2/2006 | Kincaid et al. |
| 2006/0031849 A1 | 2/2006 | Barat et al. |
| 2007/0118811 A1 | 5/2007 | Tsuchimura et al. |
| 2007/0130502 A1 | 6/2007 | Tolgu et al. |
| 2007/0165049 A1 | 7/2007 | Murawski et al. |
| 2007/0266138 A1 | 11/2007 | Spire et al. |
| 2007/0288376 A1 | 12/2007 | Block |
| 2008/0109730 A1 | 5/2008 | Coffman et al. |
| 2008/0120573 A1 | 5/2008 | Gilbert et al. |
| 2009/0075663 A1 | 3/2009 | Wilson |
| 2009/0172516 A1 | 7/2009 | Gill |
| 2009/0249290 A1 | 10/2009 | Jenkins et al. |
| 2009/0254201 A1 | 10/2009 | Glaser-Seidnitzer et al. |
| 2010/0106609 A1 | 4/2010 | Sherman |
| 2011/0238497 A1 | 9/2011 | Milne |
| 2011/0298804 A1* | 12/2011 | Hao ........................ G06T 11/40 345/440 |
| 2012/0011078 A1 | 1/2012 | Padmanabhan et al. |
| 2012/0035968 A1 | 2/2012 | Gilbert et al. |
| 2012/0072415 A1 | 3/2012 | Mora et al. |
| 2013/0086501 A1 | 4/2013 | Chow et al. |
| 2013/0132566 A1 | 5/2013 | Olsen |
| 2013/0151315 A1 | 6/2013 | Akinola et al. |
| 2013/0262348 A1 | 10/2013 | Kiran et al. |
| 2013/0298060 A1 | 11/2013 | Hoyer et al. |
| 2013/0311340 A1 | 11/2013 | Krishnan |
| 2013/0321285 A1 | 12/2013 | Hoyer et al. |
| 2013/0339082 A1 | 12/2013 | Kazmaier et al. |
| 2014/0089860 A1 | 3/2014 | Hoyer et al. |
| 2014/0108974 A1 | 4/2014 | Hoyer |
| 2014/0122346 A1 | 5/2014 | O'Brien |
| 2014/0164238 A1 | 6/2014 | Hoyer |
| 2015/0095336 A1 | 4/2015 | Green et al. |
| 2015/0195296 A1 | 7/2015 | Vasseur et al. |
| 2016/0026272 A1 | 1/2016 | Park et al. |
| 2016/0328654 A1 | 11/2016 | Bauer et al. |
| 2016/0342906 A1 | 11/2016 | Shaashua et al. |
| 2017/0006135 A1 | 1/2017 | Siebel et al. |
| 2017/0070759 A1 | 3/2017 | Flatt et al. |
| 2017/0094537 A1 | 3/2017 | Yang et al. |
| 2017/0278004 A1 | 9/2017 | McElhinney et al. |
| 2018/0060703 A1* | 3/2018 | Fineis .................... G01D 21/00 |
| 2018/0357292 A1 | 12/2018 | Rai et al. |
| 2018/0357595 A1 | 12/2018 | Rai et al. |

OTHER PUBLICATIONS

Non-Final Office Action issued in U.S. Appl. No. 15/617,447 dated May 16, 2019, 44 pages.
Non-Final Office Action issued in U.S. Appl. No. 15/617,408 dated May 16, 2019, 25 pages.
Final office action issued in U.S. Appl. No. 15/617,447 dated Dec. 10, 2019, 59 pages.
Final office action issued in U.S. Appl. No. 15/617,408 dated Nov. 18, 2019, 30 pages.
Non-Final Office Action issued in U.S. Appl. No. 15/617,408 dated Mar. 30, 2020, 29 pages.
Final Office Action issued in U.S. Appl. No. 15/617,408 dated Oct. 6, 2020, 35 pages.

* cited by examiner

MACHINE LEARNING ANOMALY DETECTION

BACKGROUND

The present disclosure relates to the analysis of large datasets.

Many ways can be used for presenting large amounts of data to users. Data can be categorized into sets, and the information can be presented using various presentation methods, including graphs, tables, and charts. It can be difficult to identify problems or trends in large data sets.

SUMMARY

This disclosure generally describes computer-implemented methods, software, and systems for machine learning anomaly detection for a set of assets. One computer-implemented method includes: analyzing, based on an anomaly-detection analysis of a plurality of assets using a set of anomaly-detection rules, each asset associated with a set of correlated records comprising a correlated set of at least one characteristic of the particular asset and a characteristic of the non-asset-specific signals, wherein each anomaly-detection rule is associated with a set of conditions determined to be indicative of a potential anomaly; providing, for presentation in a user interface, at least a subset of the plurality of assets, each asset identified as being in a potential anomalous or non-anomalous state based on the anomaly-detection analysis; receiving input from a user identifying at least one asset identified in the presentation as anomalous as a non-anomalous asset; based on the received input, modifying at least one anomaly-detection rule applied to identify the asset as anomalous; and storing the modified rule for future analyses.

The foregoing and other implementations can each optionally include one or more of the following features, alone or in combination. In particular, one implementation can include all the following features:

In a first aspect, combinable with any of the previous aspects, potential anomalies are identified from one or more value being outside of a range or a percentile.

In a second aspect, combinable with any of the previous aspects, potential anomalies are identified by looking at patterns, including time-of-day and day-of-week patterns.

In a third aspect, combinable with any of the previous aspects, wherein providing at least a subset of the plurality of assets includes providing predefined types of messages identifying information for the anomaly.

In a fourth aspect, combinable with any of the previous aspects, each asset identified as being in a potential anomalous or non-anomalous state based on the anomaly-detection analysis.

In a fifth aspect, combinable with any of the previous aspects, modifying the at least one anomaly-detection rule includes changing conditions associated with the anomaly-detection rule.

In a sixth aspect, combinable with any of the previous aspects, modifying the at least one anomaly-detection rule occurs based on an statistical significance of inputs from plurality of users taking into account quality of their past direct inputs, quality of input from their organization.

In a seventh aspect, combinable with any of the previous aspects, modifying the at least one anomaly-detection rule occurs after determining that the user has a role authorized for the change.

In an eighth aspect, combinable with any of the previous aspects, an asset is an Internet of things (IoT) device.

The details of one or more implementations of the subject matter of this specification are set forth in the accompanying drawings and the description below. Other features, aspects, and advantages of the subject matter will become apparent from the description, the drawings, and the claims.

DETAILED DESCRIPTION

This disclosure generally describes computer-implemented methods, software, and systems for analyzing large datasets. For example, the analysis can include the use of machine-guided large dataset analytics and visualization. The techniques described herein can enable data management of raw data (e.g., including millions or more of Internet of things (IoT) messages received over time) in order to generate visualizations (e.g., supporting a user interface that provides visual presentations and context to the raw data).

In some implementations, the computer-implemented methods, software, and systems for the analysis of large datasets can include three main components. First, a system can exist that automatically processes and transforms raw IoT messages and other information that is matched up with related business and external data to produce views that provide a fuller context and/or machine-generated insights (e.g., including anomalies identified in the data). Second, a self-learning system can improve the quality of machine-generated insights with human feedback that can contextualize the information and improve future insights (thus improved machine-generated insights). For example, feedback provided by a user can influence anomaly detection predictions provided to other people in the same role, in the same organization, and others. Third, a mass data visualizer can provide views for interactive visualization by users. The mass data visualizer can provide, for example, an out-ofthe-box "default" view that is generated generically, including providing an overview view into multiple assets and conditions. The mass data visualizer can provide easy navigation to anomalous assets and their visualization in multiple perspectives. For example, the system can automatically propose and/or place the visualizations into a default perspective based on the data and available insights.

The techniques described in this disclosure can provide many advantages. First, the techniques can proactively provide insights on current conditions in their assets, including providing the ability to manage assets more efficiently. Second, out-of-the-box visualizer can include an interactive tool that provides access to machine-generated insights that are readily consumable by non-data scientists. Third, a company that provides a common out-of-the-box visualizer can maintain a single component that is re-usable by all customers. Fourth, through the use of data views, most user interfaces (UIs) can be realized as visualization of one or more views, and partners/customer can build their own views without further development by the company. A visualizer can, by default, choose dimensions that provide most influence to the anomaly, such as using statistical correlation, which can cause anomalous points to cluster in a better way, thus helping the user to identify the causes for the anomaly and more clearly point out observations.

Figure 1A:
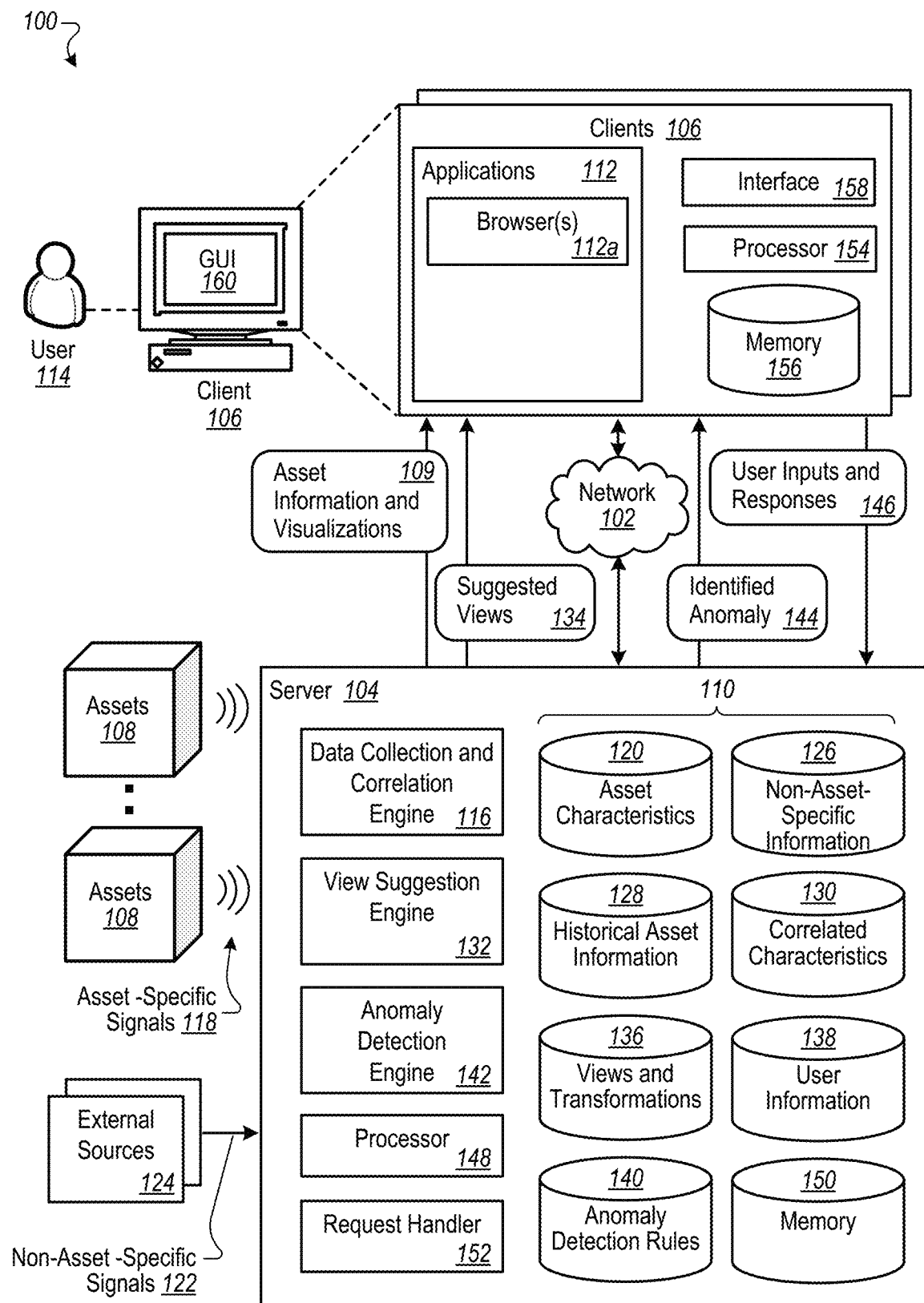
FIG. 1A is a block diagram of an example environment for analyzing large datasets.

FIG. 1A is a block diagram of an example environment 100 for analyzing large datasets. The illustrated environment 100 includes, or is communicably coupled with, at least one server 104 and plural clients 106, all connected using a network 102. The environment 100 can be used, for example, to collect and analyze large datasets containing information for millions or more of assets 108. The environment 100 can also be used to provide information about the assets 108, including visualizations, on the one or more clients 106. The assets 108 can include, for example, IoT devices such as equipment, vehicles, and other devices and/or machinery that can be connected or tracked on the Internet or via local networks. For example, the assets 108 can include a company's thousands of vending machines (and/or other stationary IoT devices) and/or a mobile fleet of trucks that service the IoT devices or are used for other functions. Different assets 108 can be present or used in implementations, including otherwise non-related assets 108 which do not have a relation to one or more of the other assets 108. Data for the different assets 108 can be managed within the system or in other, parallel systems (e.g., where each system is specific to a particular set of related assets 108).

Information and visualizations 109 for the assets 108 that are provided at the one or more clients 106 can be generated using data about the asset 108 that is managed by the server 104 and stored in databases 110, including at least one database management system (DBMS) and/or other data structures. Applications 112 at the clients 106 can include, for example, applications for reviewing asset-related information, including user interfaces that provide, to a user 114, visualizations of asset-related information, including context information regarding large numbers of the assets 108. Each client 106 comprises an electronic computing device operable to provide information to the user 114, including using data (e.g., from databases 110) from the server 104, and potentially from other sources.

A data collection and correlation engine 116 can obtain asset-specific signals 118 for the assets 108, such as by using an anomaly detection engine 142 to enrich views with anomaly states for each record. The data collection and correlation engine 116 can be provided by, or accessible to, the server 104. Obtaining the asset-specific signals 118 can include, for example, a combination of receiving signals from the assets 108 (such as when the assets 108 automatically transmit information, such as hourly, daily, or by some other schedule) and through polling of the assets 108 (such as the server 104 periodically or regularly asking for information from the assets 108). The asset-specific signals 118 can be stored in a data store of asset characteristics 120. Characteristics that define each asset 108 can include, for example, a relative location, an absolute location, business data, model number, sensor information, and other information about the asset 108. In some implementations, a particular characteristic may be associated with multiple assets or a groups of assets, such as information associated with a specific subset of vending machines, information about a group of trucks, or information associated with assets having the same model number, part number, manufacturer, history of use, maintenance schedule, location (e.g., general location), or some other information. Asset-specific signals 118 can include sensor readings, statuses and states (on/off, functioning/not, opened/closed), a current location, a speed and direction, a temperature, outside temperature, messages, diagnostic codes, power consumption, and other signals. Asset-specific signals 118 can be generated by sensors associated with and/or embedded in particular assets 108. Asset-specific signals 118 for an asset 108 can also include business-related data, such as revenue (e.g., collected by a vending machine). Asset-specific signals 118 can be marked with timestamps identifying when the signals were received, or timestamps associated with a piece of collected information (e.g., a temperature reading at a particular time), or a range of times (e.g., revenue collected over a 24-hour period).

The data collection and correlation engine 116 can also obtain non-asset-specific signals 122 from external sources 124. The non-asset-specific signals 122, while not tied directly to specific assets 108, can include information for a specific location (e.g., latitude/longitude or other coordinates) or a region (e.g., city, state, country). The non-asset-specific signals 122 can include, for example, weather information (current or forecast), traffic conditions (e.g., road construction or an accident), current events (sports, political results, news), social media sentiments (e.g., comments on a product that can be associated with an asset 108), and other information. The non-asset-specific signals 122 can include, for example, information that has already been recorded and collected for assets 108, including revenue information, historical information, and/or other information that is available from external sources 124. For example, external sources 124 can include related enterprise resource planning (ERP) systems, customer relationship management (CRM) software and/or systems, inventory systems, accounting systems, and other systems. The data collection and correlation engine 116 can decide which information received from the external sources 124 is to be retained, and the information can be stored in a data store of non-asset-specific information 126.

The data collection and correlation engine 116 can also correlate some of the received non-asset-specific signals 122 with information for at least some of the assets 108. The correlation can be based on, for example, a determined correlation between asset characteristics 120 of a particular asset 108 and a characteristic of the non-asset-specific signals 122 that are stored in the data store of non-asset-specific information 126. In some implementations, correlation performed by the data collection and correlation engine 116 can occur in real-time, such as when asset-specific signals 118 and non-asset-specific signals 122 are received, and can use information already stored in the asset characteristics 120 and the data store of non-asset-specific information 126. In some implementations, historical asset information 128 associated with assets 108 can be used in the correlation performed by the data collection and correlation engine 116. In some implementations, correlation performed by the data collection and correlation engine 116 can occur when scheduled or on an as-needed basis. Correlated information can be stored, for example, in a data store of correlated characteristics 130, such as indexed by asset 108, searchable by type or group or asset 108, and/or in other ways.

A view suggestion engine 132 can suggest views of information associated with the assets 108 and the statistically correlated characteristics 130. The view suggestion engine 132 can be provided by, or accessible to, the server 104 for use on the client 106. The view suggestion engine 132 can identify the suggested views 134, for example, by identifying, for a plurality of assets 108, a set of correlated records (from the correlated characteristics 130) comprising a correlated set of at least one characteristic of a particular asset and a characteristic of the non-asset-specific signals 122. Suggested views 134 can be based, at least in part, on past views and transformations 136 that have been used before. In some implementations, selection of the specific views and transformations 136 can depend on identifying the user 114, such as using user information 138 associated with that user.

The view suggestion engine 132 can analyze the correlated characteristics 130 to identify a set of anomaly-detection rules 140. Analysis can be based on, for example, previously determined anomalies and machine learning to identify relevant or determinative sets of characteristics. The view suggestion engine 132 can identify, for presentation of at least a subset of the assets 108, an indication of assets 108 associated with a potential anomaly.

Once a potential anomaly and associated assets are identified, the view suggestion engine 132 can identify one or more suggested views 134 based on the potential anomaly and at least one characteristic/signal associated with the potential anomaly. The correlation can be based on, for example, a degree of statistical correlation of the characteristic/signal to the anomaly.

Suggested views 134 can be a certain type of presentation or a particular format, such as a line chart, a bar chart, a column chart, a pie chart, a graph, a map, or some combination of formats. Suggested view can include particular sets of assets and particular characteristics, such as to present assets that have conditions or values associated with temperature, revenue, power consumption, or other characteristics. Any one particular view can be a product of plural transformations, each transformation creating a view (or at least an intermediate result) from received asset-specific information, asset-non-specific information, and/or existing views.

The view suggestion engine 132 can provide instructions for presenting the suggested view in a user interface, such as for presentation to the user 114. In some implementations, views can include color coding, such as to accentuate anomalies and different types of data. Views can also provide drill-down and hover capabilities, so that the user 114 can view specific non-view information, including information for one or more assets 108, that is used to produce the view. Views can be one-, two-, three-, or multi-dimensional, depending on the type of view and the dimensions represented by the information. Views can allow the user to collapse information from a higher dimension (e.g., three dimensions) down to a lower dimension (e.g., two dimensions). Views can include multiple charts or other ways of presenting information, such as presenting a chart and a table, side-by-side. Views can include filtering functions, such as to allow the user to include (or exclude) information by time, by region (e.g., selected from a map or list), by type of asset, or by some other user-selected filter(s). Views can allow for clustering of information, such as based on a current view and/or zoom level. Views can allow the user to create (and manage presentation of) stackable layers of information. Statistical correlation between an anomaly feature and all other features in relevant views/records can be determined and sorted. Statistically correlated features and anomaly features can be chosen and suggested automatically to be included in the suggested visualization. Statistical correlation (e.g., identified with True or False indicators) can be used in color-coding plotted data points in the visualization.

An anomaly detection engine 142 can detect anomalies associated with the assets 108. Anomalies can indicate, for example, one or more problems associated with one or more of the assets 108, such as temperature, power consumption, revenue, status, or other problems associated with a group of assets. For example, to detect the anomalies, the anomaly detection engine 142 can use information from the data store of anomaly detection rules 140. The anomaly detection engine 142 can be provided by, or accessible to, the server 104.

The anomaly detection engine 142 can analyze each asset associated with a set of correlated records that define a correlated set of at least one characteristic of the particular asset and a characteristic of the non-asset-specific signals. The analysis can include an anomaly-detection analysis of a plurality of assets using the anomaly detection rules 140. Each anomaly-detection rule can be associated with, for example, a set of conditions determined to be indicative of a potential anomaly. In some implementations, the anomaly detection engine 142 can detect an anomaly based solely on the characteristics of a particular asset 108, such as without the use of non-asset-specific signals.

Potential anomalies can be identified, for example, from one or more values being outside a range or percentile, such as temperature values outside of a recommended or safe temperature range, revenue values below a normal amount, or some other value(s) that are not expected. Potential anomalies can be detected, for example, by looking at patterns of values over time, such as average or normal values associated with a time-of-day, a day-of-week, or some other time indicator. Potential anomalies can be detected, for example, based on a comparison with historic data from a previous similar period, such as a comparison with last week's data, or last month's data, or the last time there was a similar event (e.g., a storm or outage). Anomalies can be calculated using training machine learning models that are trained over past data and that identify fresh records as anomalous or not. Anomalies can also be determined using unsupervised techniques, such as that do not require training, e.g., using Kalman filtering. Further, a combination of two or more value determinations can be used such that the combination of data meets a potential anomaly condition or set of conditions.

The anomaly detection engine 142 can prepare, for presentation to a user in a user interface, an identified anomaly 144 for at least a subset of the plurality of assets. Each asset 108 (or groups of assets 108) can be identified as being in a potential anomalous or non-anomalous state based on the anomaly-detection analysis. The information that is prepared for presentation to the user can include messages, including pre-defined messages, along the lines of, "X is happening, and Y is currently in effect; is this an anomaly?"

The anomaly detection engine 142 can receive inputs 146 from the user that identifies at least one asset identified in the presentation as anomalous or as a non-anomalous asset. Based on the received input 146, the anomaly detection engine 142 can modify at least one the particular anomaly-detection rules applied to identify the asset as anomalous, such as by changing conditions associated with the anomaly-detection rule, including loosening or tightening a threshold based on input provided by the user. When machine learning models are used for anomaly detection, user feedback (e.g., to identify an anomaly or not) can be added as an additional feature in the full context view and used to retrain the machine learning model, thus allowing user feedback to influence future prediction.

In some implementations, the anomaly detection engine 142 can decide to modify a particular anomaly-detection rule only after, for example, a particular number (e.g., based on a counter) of inputs have been received, such as from multiple different users. In some implementations, role-based determinations can be made, such as modifying a particular anomaly-detection rule only if a user who is considered an expert has provided input. An expert indication, for example, can cause an automatic shift of a rule without a threshold, such as if the user has been determined to be an expert based on providing quality feedback over time. A number of machine learning models can be used to automatically provide higher precedence for input from an expert user, as the expert user's inputs are likely to correlate better to the outcome. Once a particular anomaly-detection rule is modified, the anomaly detection engine 142 can store the rule (or retrain the machine learning model) for future analyses.

At a high level, the server 104 comprises an electronic computing device operable to store and provide access to information for use by the plural clients 106. For example, the server 104 can provide access to the database 110.

As used in the present disclosure, the term "computer" is intended to encompass any suitable processing device. For example, although FIG. 1A illustrates a single server 104, the environment 100 can be implemented using two or more servers 104, as well as computers other than servers, including a server pool. Indeed, the server 104 and the clients 106 may be any computer or processing device. In some implementations, the server 104 may be distributed in different locations and coupled using the network 102.

The server 104 includes a processor 148 and memory 150. Although illustrated as the single processor 148 in FIG. 1A, two or more processors 148 may be used according to particular needs, desires, or particular implementations of the environment 100. Generally, the processor 148 executes instructions and manipulates data to perform the operations of the server 104. Specifically, the processor 148 executes the functionality required to receive and process requests from the server 104. In some implementations, the memory 150 can store the database 110.

The memory 150 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 104.

Each client 106 of the environment 100 may be any computing device operable to connect to, or communicate with, other systems via a local database or via the network 102 using a wire-line or wireless connection. In general, each client 106 comprises an electronic computer device operable to receive, transmit, process, and store any appropriate data associated with the environment 100 of FIG. 1A.

A request handler 152, e.g., can handle requests received from the clients 106, e.g., for data to be provided from one or more databases 110. In some implementations, the database 110 can be implemented using one or more relational databases and/or other storage structures, and the stored data may be stored locally or distributed.

The illustrated client 106 further includes a processor 154, a memory 156, applications 112 (e.g., a browser), and an interface 158. The interface 158 is used by the client 106 for communicating with other systems in a distributed environment—including within the environment 100—connected to the network 102, e.g., other systems communicably coupled to the network 102 (not illustrated). Generally, the interface 158 comprises logic encoded in software and/or hardware in a suitable combination and operable to communicate with the network 102. More specifically, the interface 158 may comprise software supporting one or more communication protocols associated with communications such that the network 102 or interface's hardware is operable to communicate physical signals within and outside of the illustrated environment 100.

Applications 112, including at least one browser 112a, can receive and provide information to the users 114 on each of the respective clients 106. As an example, in order to update a web page displayed in a browser on the client 106, the application 112 can provide a request for data from one or more databases 110 managed by the server 104.

As illustrated in FIG. 1A, the client 106 includes the processor 154. Although illustrated as the single processor 154 in FIG. 1A, two or more processors 154 may be used according to particular needs, desires, or particular implementations of the environment 100. Generally, the processor 154 executes instructions and manipulates data to perform the operations of the client 106. Specifically, the processor 154 executes the functionality required to send requests to the server 104 and to receive and process responses from the server 104.

The illustrated client 106 also includes a memory 156. The memory 156 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client 106.

The illustrated client 106 comprises a graphical user interface (GUI) 160, as shown with respect to and included by the client 106. The GUI 160 interfaces with at least a portion of the environment 100 for any suitable purpose, including user interface screens that display information associated with databases 110, allow queries to submitted, and allow data models to be designed, for example. For example, the user interface screens can provide user entry fields and/or other user entry controls for which a user can provide user inputs, e.g., through the applications 112. User inputs can include, for example, textual input, selections from controls (e.g., menus, lists, options or other elements), navigation commands (e.g., cursor/mouse movements), and/or complex structures (e.g., files, images, sounds, videos). In some implementations, user inputs can be associated with a context, e.g., a particular state or segment of an application.

Figure 1B:
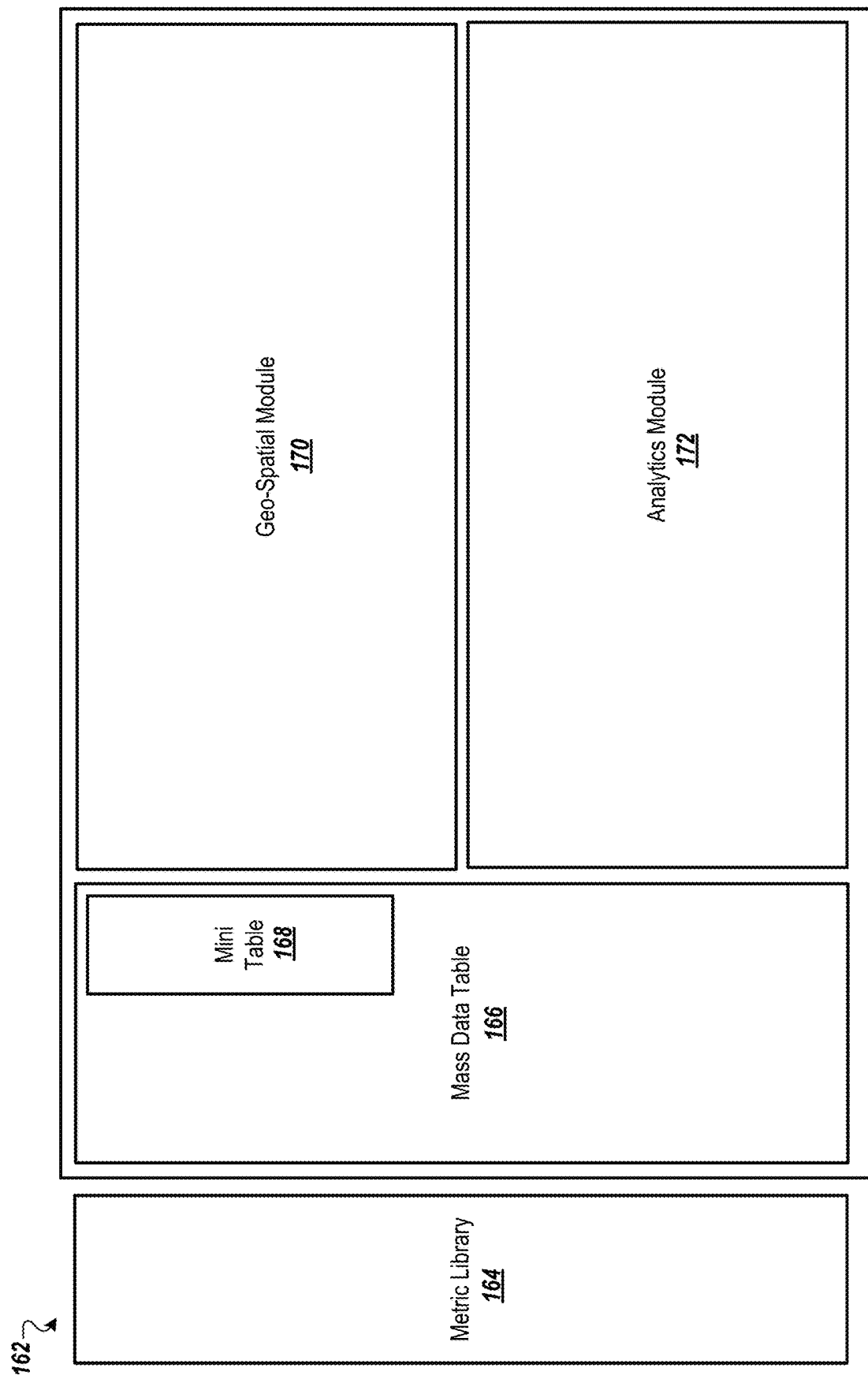
FIG. 1B is a block diagram of an example architecture for providing visualizations of assets.

FIG. 1B is a block diagram of an example architecture 162 for providing visualizations of assets. For example, the visualizations can be visualizations of the assets 108. Components of the architecture 162 can provide users with quick access to a complete data set and can allow users to correlate data in the complete data set using additional tools such as a miniature table 168. A mass data analyzer can provide necessary context for exploration by yielding the connections between, for example, geo-spatial data (provided from a geo-spatial module 170), analytical information (provided by an analytics module 172), and flat-list based data (provided from a mass data table 166). Users can filter, search, and sort data with simple paradigms (such as drag-and-drop) while using a set of measures, dimensions, and attributes to allow for flexibility to gather necessary insights. A metric library 164, for example, can provide metrics used to correlate the data, and the metric library 164 can be displayed or hidden.

Figure 1C:
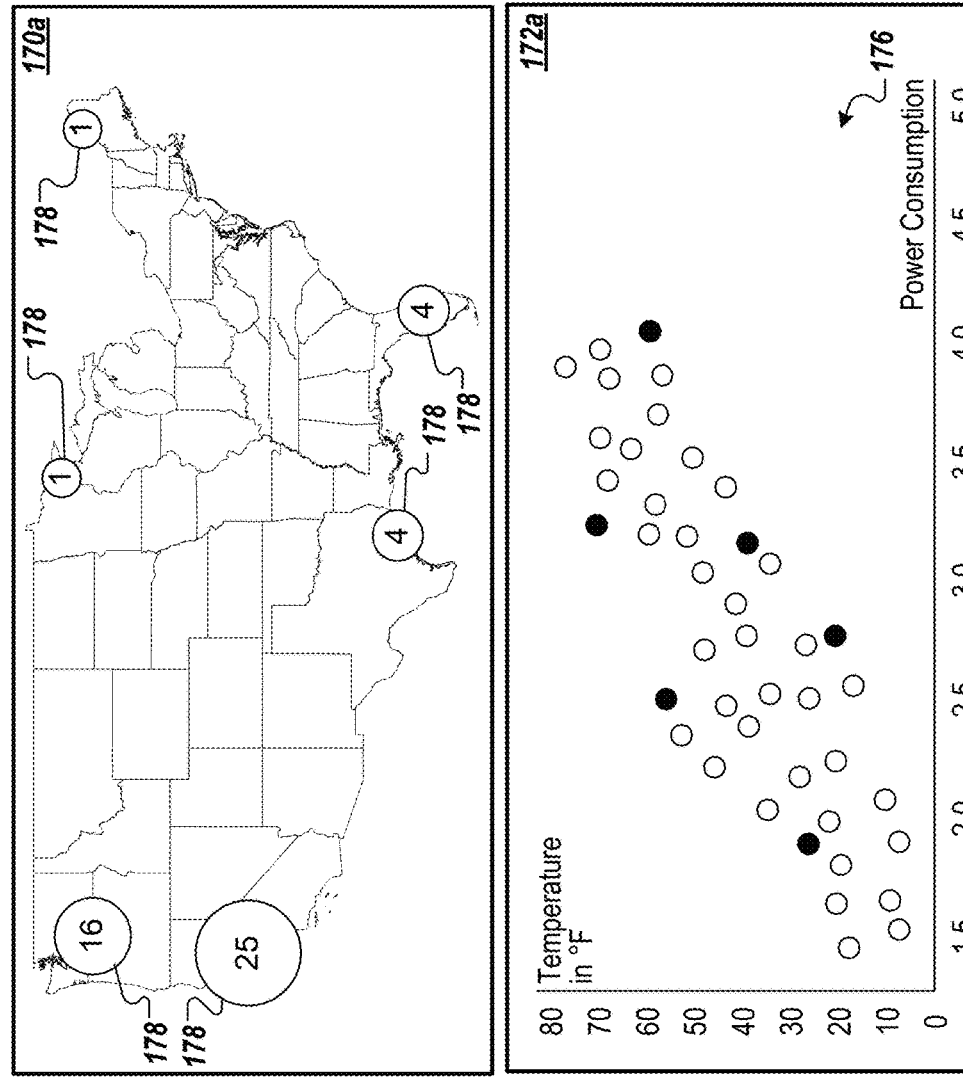
FIG. 1C is a screenshot of an example user interface supported by the architecture.

FIG. 1C is a screenshot of an example user interface 162a supported by the architecture 162. Entries 166a in the miniature table 168 can provide a visualization of an entire data set in an abstracted manner, such as using lines having different colors that represent different types of values in the data. Lines 174 are shown as different thicknesses in FIG. 1C to represent different colors. The miniature table 168 can also provide individual data points for quick access, such as by allowing users to click on one data point to quickly scroll to a certain position of the mass data table 166. Both the geo-spatial module 170 and the analytics module 172 can be dynamic with regards to the information that they present to the user, in a geo-spatial view 170a and an analytics view 172b, respectively. Based on the nature of the data set as well as suggested visualization by the system, both the geo-spatial module 170 and the analytics module 172 can be replaced with other modules. Such replacement could then change the type of information that is presented to the user, e.g., by replacing one or more of the spatial view 170a and the analytics view 172b with something else.

At any point in time, the information that is presented within the architecture 162 can be tied to a specific data view that has a set of attributes, measures, and conditions (e.g., including anomalies). Further, user selections in the mass data table 166 and the miniature table 168 can be used to identify and highlight information presented for assets 108 provided for display by the geo-spatial module 170 and the analytics module 172 (in the geo-spatial view 170a and the analytics view 172b, respectively). For example, information that is displayed can automatically pan to relevant items, which become visible and highlighted.

The mass data table 166 can present information, for example, for all assets 108 with selected attributes for a current view (which can be configurable). The miniature table 168 can be rendered from one or more condition attributes, which can determine the color of bars that represent particular entries. For example, the color of a bar can depend on the value of a condition variable. In some implementations, a white color (e.g., based on a zero value for a condition) can be used to indicate that no anomaly exists, and one or more shades of blue (e.g., based on non-zero values for the condition) can be used to indicate that an anomaly exists. Other colors and visual distinctions are possible.

The geo-spatial view 170a provided by the geo-spatial module 170 can show locations of assets 108 on a map. Data can be aggregated by spatial aggregation 178 to show asset 108 counts at various cluster centers 178, such as how many IoT devices are at a specific location at a current zoom level of the map. In this way, clustering can be a function of at least the current zoom level, since as the zoom level increases, clusters may break into smaller clusters.

The analytics view 172b can provide an analytical view. Controls can be provided that allows a user to select various dimensions, such as temperature and pressure, in order to generate a graph, plot 176, or other graphical representation showing relationships between the dimensions. Data points can be color-coded according to conditions, such as higher values being represented using one group of colors (e.g., primarily reds) and lower values being represented using another group of colors (e.g., primarily blues). In some implementations, the system can either automatically select dimensions and colors, or the system can suggest dimensions that are likely to most clearly visually separate the conditions, such as based on a correlation between the condition and other view attributes. Two-, three-, and/or four-dimensional graphs can be displayed.

The number of dimensions that are chosen can allow users to gain different perspectives, for example, on a particular graph to allow users to make intelligent decisions based on new insights. In some implementations, a three-dimensional view can be rotated in order to surface an anomaly that may be hidden from view, such as if another data point covers the anomaly's data point in a current perspective. For example, rotation controls can be provided by a 3D controller that allow users to freely rotate graphs and other displayed elements.

A zoom controller can be provided that allows users to drill into a certain section of a graph or gain a bigger picture by zooming out. Hover states can be provided that allow users to identify details of a data point without cluttering the screen in a zoomed-out state. Color differentiation can be provided to allow users to overlay, multiply, or separate values for better insight and/or correlation of data. Stacked layers can be used, including to display a layer at some distance from another layer, or to overlay layers one-to-one.

Figure 1D:
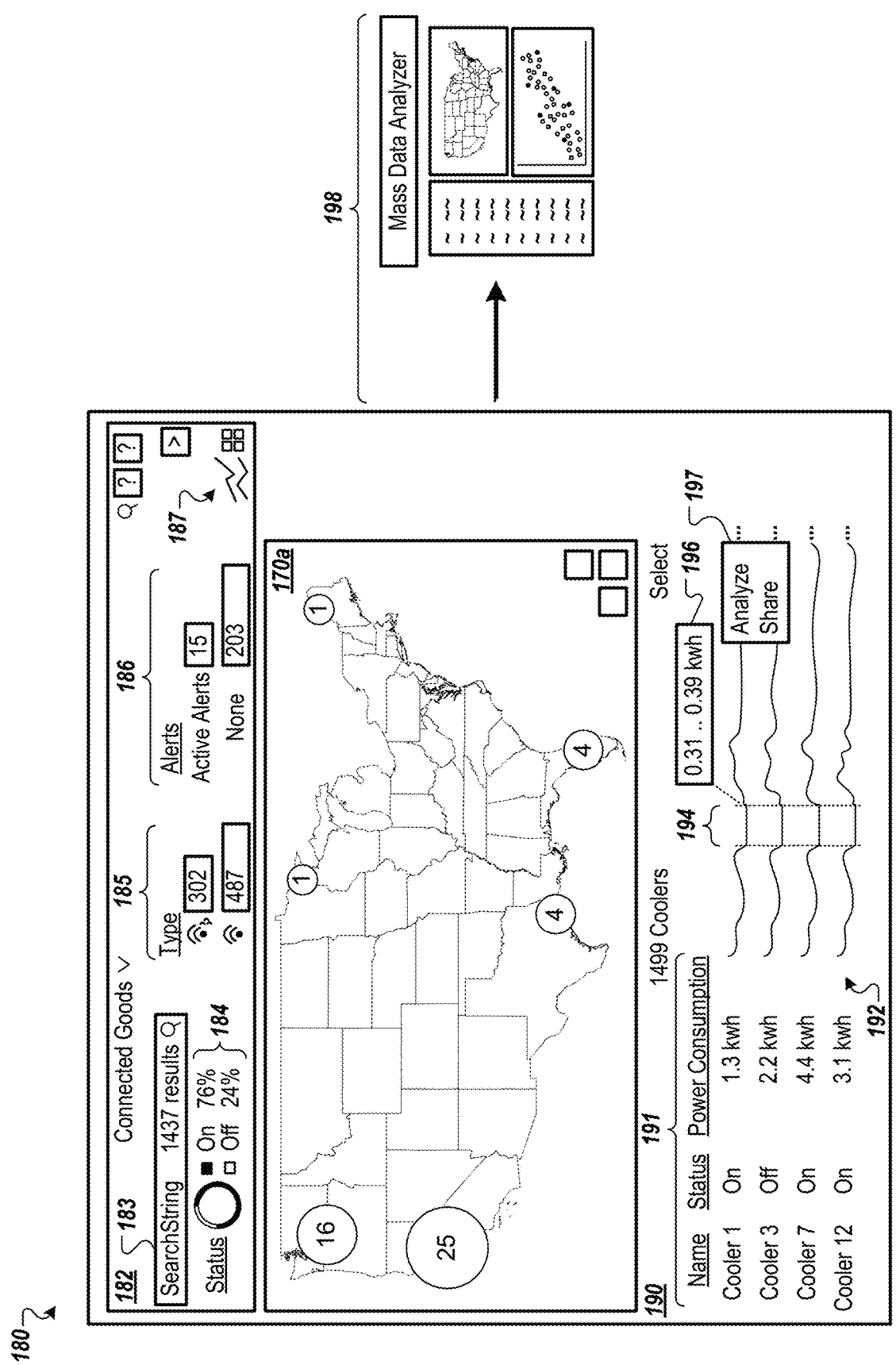
FIG. 1D shows an example view.

FIG. 1D shows an example view 180. The view 180 includes a display panel 182 in which a search control 183 can be used to select and/or filter elements displayed in the view 180. Status displays 184 can graphically and/or numerically indicate statuses, e.g., for assets 108, such as vending machines, that are either On or Off. Asset type displays 185 can graphically and numerically indicate different types of assets. Alert displays 186 can identify numbers of assets that currently have an alert, such as correlated to detected anomalies. Controls 187 can be used to select types of presentations, such as scatter plots or graphs, to be displayed in a presentation area 190. Asset information 191, such as providing power consumption information for assets 108 that have potential anomalies, can have corresponding graphs 192, such as showing power consumption over time. The graphs 192 have time periods 194 in which one or more anomalies potentially exist. Hovering over a portion of the graphs 192 can cause detailed information 196 to be displayed. Using controls 197, for example, a transformation can occur, such as to create another view 198.

Figure 2:
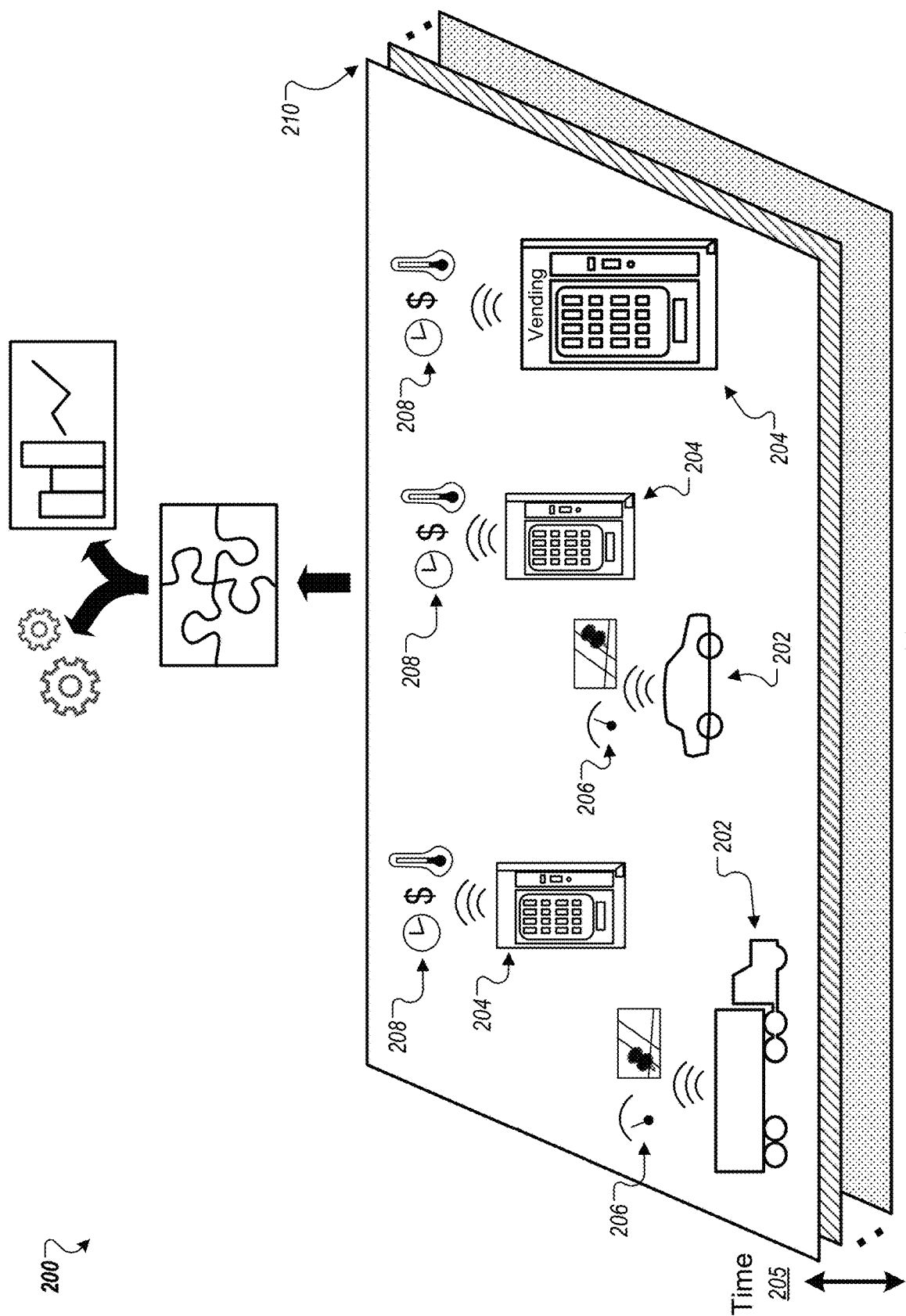
FIG. 2 is a conceptual diagram showing an example scenario of large amounts of data received from plural assets over time.

FIG. 2 is a conceptual diagram showing an example scenario 200 of large amounts of data received from plural assets over time. For example, the scenario 200 includes mobile assets 202 and stationary assets 204. Mobile assets 202, for example, can be any types of IoT things in space that change location, such as cars, trucks, and other mobile vehicles or equipment. Stationary assets 204 can include equipment that typically remains in a fixed position, once installed or delivered, such as vending machines, printers, copiers, security systems, heating/cooling devices, warehouse equipment, and other equipment and/or machines.

Over time 205, mobile assets 202 can typically transmit information 206 such as their location, fuel remaining, status information, equipment readings, and other information. Stationary assets 204 can typically transmit information 208 such as equipment status, revenue collected, temperature readings, and other information that is provided while each stationary asset 204 ids in a particular location. Information 206 and 208 include time-dependent information, such as information that is provided at regular intervals, on demand, polled (e.g., from a central server), or pushed (e.g., in response to events of interest). Time-dependent information can include readings and/or information that is a one-time reading (e.g., with timestamp), cumulative information, data applicable to a particular time range, and/or other time-dependent information. Time-relatedness of the information 206 and 208, received over time 205, is depicted in FIG. 2 as a series of layers 210.

Each of the mobile assets 202 and the stationary assets 204 can have different patterns over time which information 206 and 208 is provided. For example, each type of asset can emit signals directly (e.g., via sensors and transmitters) and/or indirectly (such as through related enterprise resource planning (ERP) and customer relationship management (CRM) software and/or systems. A goal of techniques described herein is to capture related information (e.g., including transmitted data points and ERP/CRM information) and gain an understanding of and insights into conditions that exist (e.g., "Why are vending machines in certain areas consuming more than usual power or providing less than usual revenue?").

Generally, mobile assets 202, through their movement from place-to-place, can produce geo-spatial data, such as a current location identified through global positioning system (GPS) capabilities and/or other location tracking systems including radio frequency identifier (RFID), near field communication (NFC), and/or other technologies.

Generally, stationary assets 204 can be assets that reside in a particular space or location, such as a vending machine placed in a particular brick-and-mortar location. In some cases, stationary assets 204 can be relocated, and in such cases, an assignment to a location can be temporal. Stationary assets 204 can also serve as location marker, e.g., to provide additional context in space, such as to designate a location for tools that are stored or otherwise exist in proximity to machinery (e.g., that is itself a stationary asset 204).

Signals that are produced by the mobile assets 202 and the stationary assets 204 can include instrument readings (e.g., a series of temperature readings over time), status information (asset is available/on versus unavailable/off), monetary information (e.g., vending machine revenue for the day), user/customer information (e.g., who is using the asset, such as a driver in a company car or truck), and/or other information.

In addition to signals that are produced and received, transactions can also be used in combination with the signals to analyze information. For example, transactions can exist for objects that are related to IoT assets, and the transactions can be received by various systems. Example transactions can include vending machine logs of "dollar amounts transacted," a series of alerts associated with a shipment of products, and/or other information extracted from or provided by business warehouse (BW) systems.

Space-related and location-related information can also be used in combination with signals received from assets. For example, information for a particular geographic area can be used to explain patterns associated with the use and status of assets. Spaces and/or areas can also be used to geographically relate and/or provide a container for assets (e.g., IoT devices). A set of spaces can capture and/or be defined by building plans, city map overlays, geographical information systems (GIS), and/or other types of geo-spatial systems, tool, and context. Space and area definitions can further be used, for example, as a proxy for injecting external data, such as weather, traffic, emergency, current events, or other information. Space-related organization and designation can change over time.

In order to perform the techniques described herein, metadata can be defined and/or captured for the mobile assets 202 and the stationary assets 204. The metadata can be used in models (e.g., upon which visualizations are based). The metadata can include, for example, the type of asset, attributes of the asset, relationships between the asset and information in CRM/ERP and other external systems, space/layout/location information, and time bucket profiles and calendars. The metadata can include information about views and transformations, such as definitions of big data views that capture data generated by things (e.g., assets) in action, and transformations needed to produce these views and generate new views as needed by users. In some implementations, incoming IOT messages can be considered as raw "views" in that the IOT messages can be used to construct full context views through network transformations and enrichment. Raw messages can also be treated as implicit views.

Figure 3:
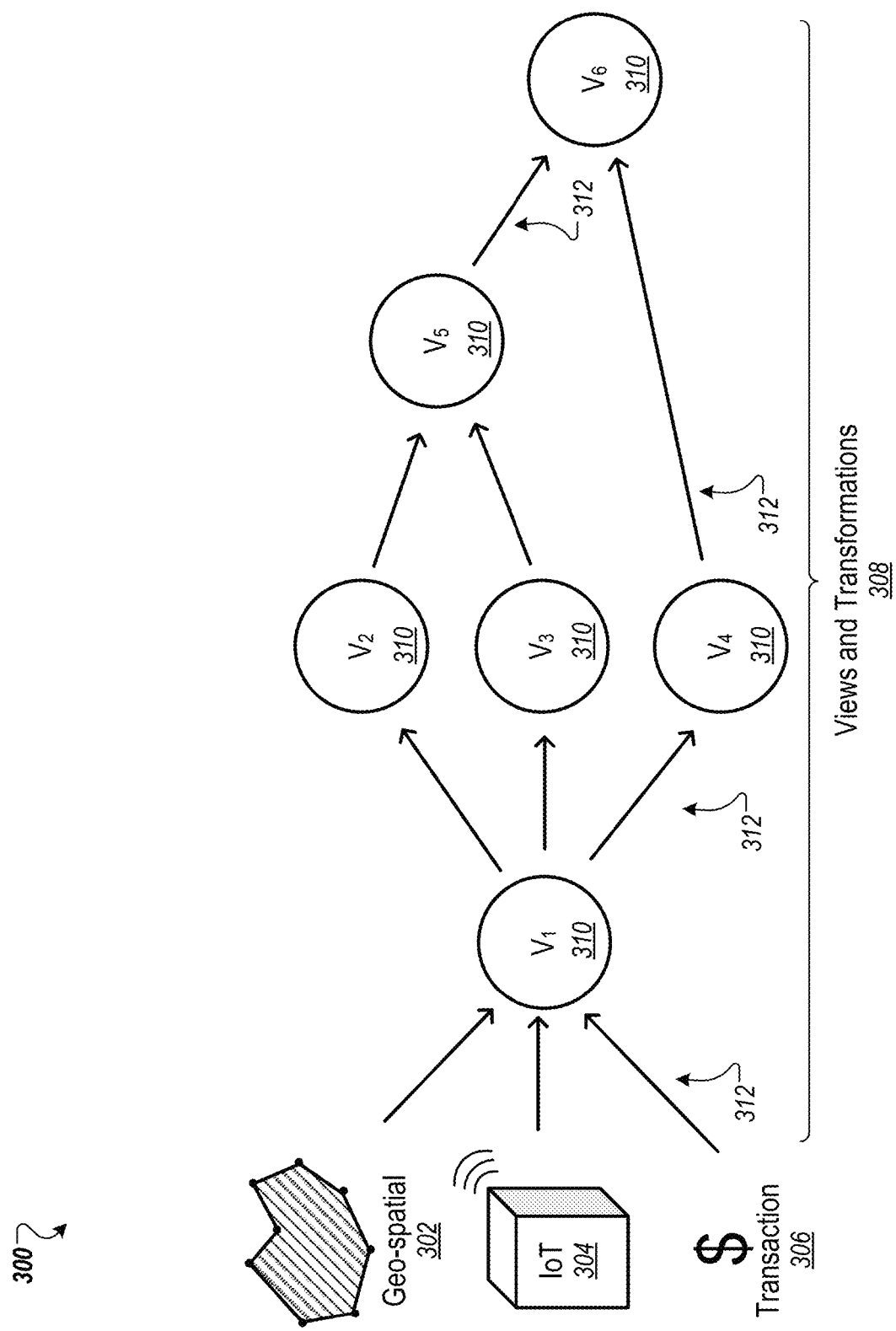
FIG. 3 is a diagram of an example flow of information used for large dataset views.

FIG. 3 is a diagram of an example flow of information 300 used for large dataset views. For example, the flow of information 300 can begin with the receipt of geo-spatial information 302 (e.g., location information for the mobile assets 202 and the stationary assets 204), IoT transmissions 304 (e.g., status information, states, and other information received from the mobile assets 202 and the stationary assets 204), and transaction information 306 (e.g., revenue, cost, and/or other financial information received from CRM/ERP and other external systems). Data that is received can be ingested and can flow into and through a network of views and transformations 308. All the views (e.g., views 310 $V_1$ through $V_6$) can be consumed by various front ends, such as user interfaces for requesting and viewing views. Data for the views and transformations 308 that is needed to bring data into these views can be governed by metadata as described herein. Transformations 312 are represented in the flow of information 300 as arrows connecting the views 310.

Figure 4:
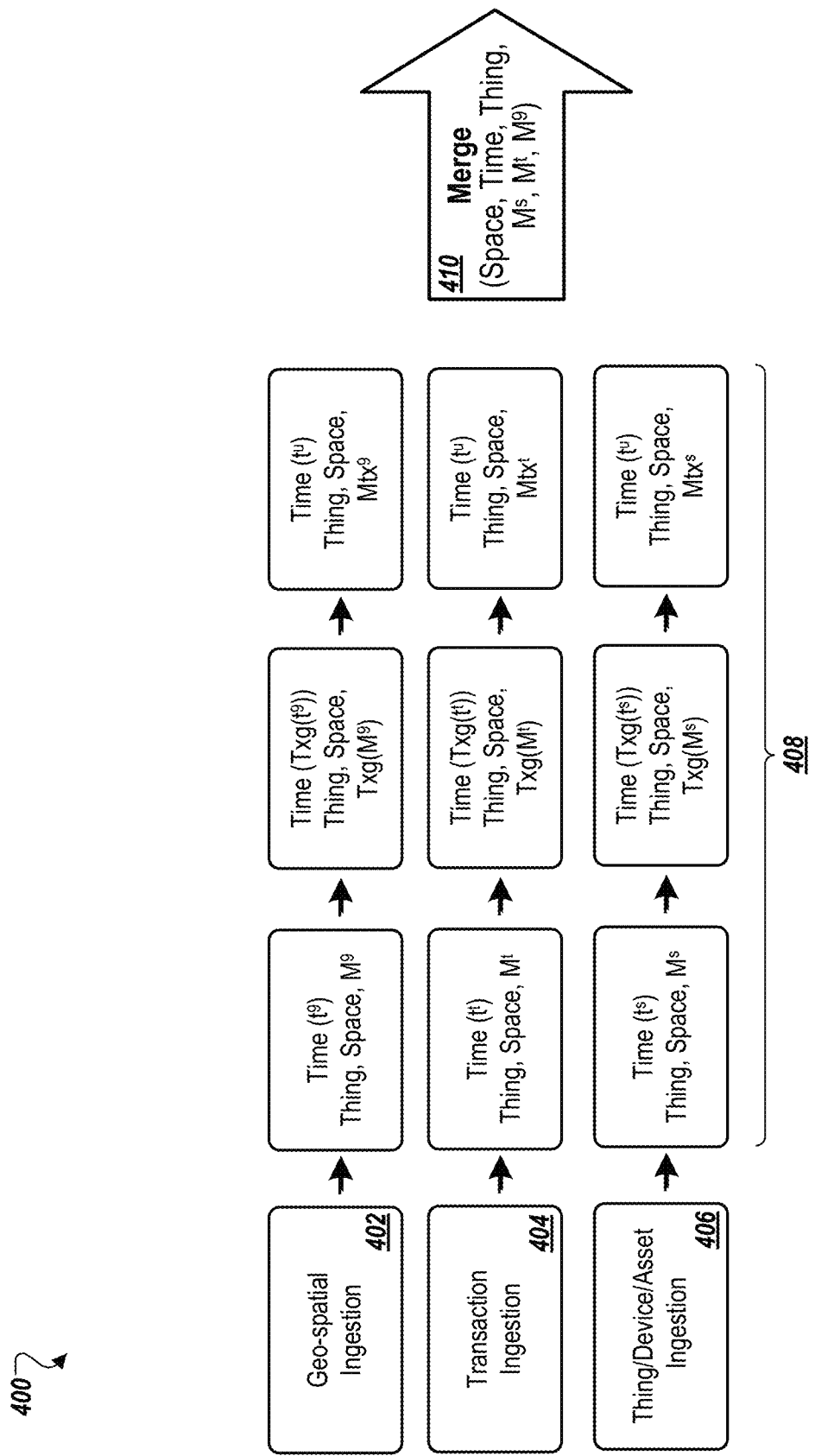
FIG. 4 is a diagram of an example network of merged information used in views.

FIG. 4 is a diagram of an example network 400 of merged information used in views. For example, the network 400 can be supplied by ingested information, such as geo-spatial ingestion 402, transaction ingestion 404 (including signals received from the mobile assets 202 and the stationary assets 204), and thing/device/asset ingestion 406. The information that is ingested can be merged through a process of enrichment over time (e.g., a time series). For example, data that is ingested can include asset and time dimensions 408 that allow the data to be merged 410. Preconditions can be defined, for example, by which time and asset dimensions can be matched immediately upon receipt or subsequently matched transformations Various types of time-related and time series data can be collected and used in merging. For example, numeric signals can time instant signals, such as (time, dollar amount) pairs, e.g., [1:00 pm, $30], [1:04 pm, $22], [2:01 pm, $50], and so on. Bucketed time, for example, can include [time range, dollar amount] pairs such as [1-2 pm, $330], [2-3 pm, $202], [3-4 pm, $500], and so on. Time-related signals can also include categorical information such as [time, category] event pairs, e.g., [1:00 pm, OVERHEATED], [1:04 pm, DEPARTED], [2:01 pm, DELAYED], and so on. Time-related signals can also include state-related information, such as [time, state] pairs, e.g., [1:00 pm, WAITING], [1:04 pm, IN TRANSIT], [2:01 pm, ARRIVED], and so on.

Format of time-related information is summarized in Table 1:

TABLE 1

Aligning Axes

| FROM | | Instant/ Numeric | Bucketed/ Numeric | Instant/ Categorical | Bucketed/ Categorical |
|---|---|---|---|---|---|
| Instant/ Numeric | 1:00 pm, $30 | NA | 1:00-2 pm, 300 (SUM/AVG) | N/A | N/A |
| Bucketed/ Numeric | 1-2 pm, $330 | NA | aggregation | N/A | N/A |
| Instant/ Categorical | 1:00 pm, OVERHEATED | 1:00 PM, 1 (=event occurred) | 1-2 pm, 5 (count of events) | N/A | 1-2 pm, TOO_MANY_OVERHEATED_EVENTS |
| Bucketed/ Categorical | 1:00 pm, WAITING | 1:00 PM, 1 (=in WAITING state) | 1-2 pm, 30 (time in waiting state) | N/A | N/A |

Table 1 shows how signals can be converted from one time format (items in second column) to destination time format (format named in the column header) where possible. For example numeric quantitative data which has time-stamped can be transformed to bucketed format by simple aggregation—row 2, column 4. The "Bucketed/Numeric" column can indicate bucketing of information. A "Bucketed/Categorical" column can indicate a trend, or even a context related to received time-related information, such as indicating that between 1-2 PM too many overheated events were received.

Table 2A shows example attributes that can be assigned to various time-related information:

TABLE 2A

View Attributes

| VIEWID | NAME | TYPE | CALENDAR |
|---|---|---|---|
| TIME_PROF1 | TIMESTAMP | TIME_INSTANT | |
| TIME_PROF2 | HOURLY | HOURLY | 1 |
| TIME_PROF2 | DAILY | DAILY | 2 |

Transformations can be used to generate one view from another declaratively, such as the transformations 312 used to create the views 310. Transformations can be based on basis metadata that exists for assets, such as metadata for the mobile assets 202 and the stationary assets 204. The metadata can include, for example, information identifying source views (e.g., an input to one or more transformations), target views (e.g., the outputs of transformations), types of views (e.g., whether the view is a SQL result, a union, a merge, a relation mapper used for mapping to target relation objects, a master data add type that is used to add master data attributes to an incoming data item, and custom types), and filters. The structure of incoming messages is known, for example, as an asset cooler can send a message consisting of a cooler ID and a temperature. The data elements in the source message and final target view can be assigned a domain, as shown in examples in Table 2B below. It is possible to start from a data element/characteristic/signal in the target view, identify its domain, and then work backwards to find messages which contain data elements with the same domain. Thus it is possible match target views to input messages. Then it is a matter of calculating what transformations are needed to convert message(s) to the target view.

TABLE 2B

Example Domain

| ID | Name | Description | Datatype | Default Aggregation | Default Aggregation Domain |
|---|---|---|---|---|---|
| VM_ID | VM_ID | Vending machine ID | INT | | |
| TEMPERATURE | TEMPERATURE | Temperature | DEC | AVG | Temperature |
| DOOR_OPEN | DOOR_OPEN | Door open status | BOOLEAN | COUNT | COUNT |
| EVENT_NAME | EVENT_NAME | Event name | STRING | COUNT | COUNT |
| MATERIAL_ID | MATERIAL_ID | Material ID | INT | | |
| COUNT | COUNT | Count | INT | | |
| REVENUE | REVENUE | Revenue | DEC | | |
| LATTITUDE | LATTITUDE | Latitude | DEC | | |
| LONGITUDE | LONGITUDE | Longitude | DEC | | |
| HUMIDITY | HUMIDITY | Humidity | DEC | AVG | HUMIDITY |
| TIMESTAMP | TIMESTAMP | Timestamp | TIMESTAMP | | |
| TIME | TIME | Time | INT | | |
| CITY | CITY | | STRING | | |
| AREA | AREA | | STRING | | |
| COUNTRY | COUNTRY | | STRING | | |
| CONDITION | CONDITION | Machine classification of data point | INT | | |

Each transformation can have one or more inputs and outputs. In some implementations, an output of each transformation can be written to a data frame (e.g., a Spark data frame) or some other collection of data organized into named columns. This can make each output accessible to any subsequent transformation in a sequence or transformations. Most transformations can be expressed using SQL statement, which can make transformations relatively simple to implement. The same or similar techniques can be used for customer-defined transformations.

Table 3 lists example transformations, with their transformation IDs, their types, and a representative SQL query that can define the transformation:

TABLE 3

Transformations Table with Associated Types and Queries

| TRANSID | TRANSTYPE | QUERY |
|---|---|---|
| Tquery1 | SQL | SELECT col1 as Daily, col12 as Hourly, sum(col13) as Temperature from input* group by col11, col12 |
| Tcode2 | CUSTOM | (some.scala.class.name).execute(sqlContext) -> Produces Temp Table named "tcode2" |
| Tquery3 | SQL | SELECT col11, sum(col13) from tquery3 group by col11, col12 |
| Tquery4 | SQL | SELECT input.col11, tcode2.col11, sum(input.col12) from input left join tcode2 on input.col11 = tcode2.col11 group by input.col1, tcode2.col11 |
| Tcode5 | CUSTOM STATE | (some.scala.class.name).execute(DStream) -> Produces Another DStream |

Table 4 describes an example sequence in which transformations are to be executed. In some implementations, view and transformation metadata can be checked to verify that the entire plan for an execution sequence is valid, for example, to ensure that required inputs for a given transformation are generated by previous transformations.

TABLE 4

Example Transformation Sequence

| SEQ | Group | TRANSID |
|---|---|---|
| 1 | 1 | Tquery1 |
| 2 | 1 | Tcode2 |
| 3 | 1 | Tquery3 |
| 4 | 1 | Tquery4 |
| 1 | 2 | Tcode5 |

The first TRANSID can operate, for example, on the raw point stream data, such as data received directly from the mobile assets 202 and the stationary assets 204. The data structure in this case can be the device-specific (e.g., vending machine-specific, or car-specific) message type.

Tables 5 and 6 show example transformation IDs and view IDs for output and input transformations, respectively. Although separate tables can be used for which is in that case the first transformation in the sequence (e.g., SEQ=1 in Table 4), there need not be separate tables in various approaches.

TABLE 5

Output Transformation

| TRANSID | VIEWID |
|---|---|
| tquery1 | v1cd |
| tquery1 | v1hd |

TABLE 6

Input Transformation

| TRANSID | VIEWID |
|---|---|
| tquery1 | V1 |
| tquery1 | v1hd |

In some implementations, functions can be used in transformations. The functions can include, for example, prebuilt functions using complement transformations. As an example, a function using SPACE(LAT, LONG) →SPACE_ID can map LAT, LONG to a space ID based on spatial master data At transformation runtime, e.g., when one or more output views are generated based on a transformation from one or more input views, the transformation can progress from ingestion to transformations that occur further downstream in a sequence. For example, a Spark process can be used that enables the transformation of point-stream/processed data and the writing of any number of views to a server or other system. The number of views and their composition can be driven by application queries, e.g., that define the transformations.

In some implementations, a sequence of transformations can be orchestrated using a Spark Directed Acyclic Graph (DAG) or similar tool or technique. For example, the Spark DAG can be constructed by reading from a Transformations Table (e.g., table 3 or similar table). In this case, each TRANSID can be a node on the DAG. Transformations can be one of various types. When a transformation is of the type SQL, for example, dataframe SQL can accommodate the vast majority of application query requirements for the transformation. When a transformation is of the type CUSTOM, for example, the requirements can be more complex, as some custom Scala code can be supplied via a class which houses the transformation logic. For a transformation of type CUSTOMSTATE (e.g., for streaming transformations only), in order to maintain a stateful DStream during Spark streaming, state update logic can be supplied in a custom class.

Each transformations result can be available to other transformations via a temporary Dataframe, e.g., named using the TRANSID. The following is an example sequence of transformations which form a DAG. During the Spark orchestration that includes output operations, a node on the DAG can optionally have an output operation associated with it. The operation can, for example, store the results of the transformation in a server or other system. Tables that can be required for the Spark process to construct a write operation are now described for views and transformations.

A VIEW_CONFIGURATION table (e.g., Table 7) can be used to house view specific configurations that are required now or in the future. For example, the table can support the concept of writing to main and delta tables, which can require periodic merges, as indicated with a parameter key of "MERGE INTERVAL SECONDS" in Table 7:

TABLE 7

View Configuration Table

| VIEWID | PARAMETER KEY | PARAMETER VALUE |
|---|---|---|
| v1cd | MERGE_INTERVAL_SECS | 86400 |

In some implementations, a DAG setup algorithm can be used for setting up transformations, e.g., with the algorithm being based on the following pseudo-code:

```
ViewsList <- initialize from metadata
Transformations <-Initialize from metadata
inputs <-Initialize from transformations input metadata
outputs <-Initialize from transformations output metadata
IngestionTopics <- initialize from metadata
outputMap <- empty
While (notEmpty(transformations))
{
    T <- getNext(Transformations)
    I <- getInputs(t)
    If (I in outputMap)
    {
        O <- getOutputs(t)
        outputMap(O.vewname).Value <- Transform(T,
outputMap.getInputs(t))
        transformations.remove(T)
    } else if (I in IngestionTopics)
    {
        O <- getOutputs(t)
        outputMap(O.vewname).Value <-
TransformFromIngestion(T,
ProxyViews(kafkatopics.getTopics(I)))
        transformations.remove(T)
    }
}
```

Additional code can be used to dynamically create a Spark DAG using the SQL, CUSTOM and CUSTOM-STATE transformations.

The following pseudo-code can be used to generate transformations:

```
Transformations autoGenerateTransformations(outputView)
{
    ret_Transformations <- empty
    penultimateViewSet <- empty
    outputMeasures <- getMeasures(outputView)
    inputViews <- getInputViews(outputView) // from meta
data
    inputMeasures <- getMeasures(inputViews) // direct
from meta data
    // identify input measures needed to produce the
output measures
    matchingInputMeasures <- matchDomain(inputMeasures,
outputMeasures)
        // all output measures must be matched,
        // else transformations will be
incomplete, not all required data can be produced
    viewsCount <- 0
    For each inputView in matchingInputMeasures
        viewsCount <- viewsCount +1
        Measures <- getMeasures(inputView,
matchingInputMeasures)
        (T, penultimateView) <-
generateViewTransformations( inputView,
            outputView, measures, viewsCount*1000)
        ret_Transformations <- ret_Transformations +T
        penultimateViewSet <- penultimateViewSet+
            penultimateView
    /// Final merge
    ret_Transformations <- ret_Transformations
+mergeTransformation(penultimateViewSet,
        outputView)
    return Transformations
}
Transformations generateViewTransformations (inputView,
outputView, measures,
    transformationSequence)
{
    ret_transformations <- empty
    ret_view <- empty
    if assetType(inputView = assetType(outputView) AND if
        TimeProfile(outputVIew) = Timeprofile(inputView)
            ret_view<- inputView
        else
            if TimeProfile(outputVIew) <>
Timeprofile(inputView)
                tmpView <- changeTimeProfile (inputView,
timeProlile(outputView)
                t <- createTimeTransformation(inputView,
tmpView,
                    transformationSequence,
transformationSequence)
                ret_transformations <- ret_transformations
+t
                (t, tmpview1)<-
generateTransformation(tmpView,
                    outputView, transformationSequence+1)
                ret_transformations <- ret_transformations
+t
                ret_view<- tmpview1
            else if assetType(outputVIew) <>
assetType(inputView)
                if Related(assetType(outputVIew),
assetType(inputView))
                    tmpView <- changeToNextRelation
(inputView,
                        assetType(outputView) // immediate
related asset
                    (t, ret_view )<-
createRelationTransformation (inputVIew,
                        tmpView, transformationSequence
)
                    ret_transformations <- ret_transformations
+t
                    (t, ret_view)<- generateTransformations
(tmpView, outputView,
                        transformationSequence+1)
                    ret_transformations <- ret_transformations
+t
    end if
    return (ret_transformations, ret_view) ;
}
```

Once views are created, the views can be merged, e.g., automatically. One of the key goals of merging, for example, is automatically merging incoming data from various sources containing a variety of data types. For example, using techniques associated with the data architecture described in this document can provide the ability to automatically merge time series data of various kinds, such as data related to sensors, transactions, weather, revenue, and other aspects. As a result, it can be possible to automatically merge data to produce a desired composite target view, based on multiple ingestion messages and providing the capability for unified data exploration.

As an example, the following algorithm can be used for automatically merging views. Using the algorithm, a merged view can be generated from data that is ingested, e.g., received from mobile and stationary assets.

First, for a given [ingestion viewset, target combined view], a common aligned viewset is generated. For each [TxSetDef, TempViewsetDef], the transformation(s) and view(s) needed for merging views are determined. This includes identifying a time profile from the target view and the source view, and generating transformations view definitions needed to convert to common intermediate views. TxSetDef is executed to generate a TempViewset. Next, TempViewsets are joined, including selecting needed attributes and measures to generate the target view.

For orchestration, e.g., Spark orchestration, there can be at least two output operations types. For example, the outputs can be constantly inserted into base tables, or the outputs can be handled by writing aggregates, e.g., from Spark.

One of the problems associated with orchestration can be requiring that all data be processed exactly once, however some techniques, e.g., Spark streaming, may only guarantee that a data point is processed at least once. This can be due to the use of check-pointing to keep track of offsets that are processed, and Spark, for example, may replay all data from the last check-pointed offsets after a failure, resulting in some data being reprocessed. This issue can be solved differently for both types of output operations.

For example, for non-aggregate output operations, a Spark batch "ID" column can be maintained in the target tables. During recovery from a checkpoint, for example, data that is going to be re-processed can be deleted before the recovery process begins.

The use of aggregate tables can include the use of writing to (e.g., inserting into) a delta table, which can have performance advantages over performing table updates and/or maintaining a Spark state. Periodically, delta information can be merged with its main counterpart. However, the use of aggregate tables can have disadvantages including, for example, dealing with late data and dealing with replay of data due to a checkpoint recovery.

As an example, for an hourly (based on device timestamp) aggregation job that is defined, the following records can be inserted into the following delta table by Spark.

TABLE 8

| | | Delta Table | | | |
|---|---|---|---|---|---|
| COL1 | COL2 | KPI1 | TS (Data) | TS (Spark batch) | Status |
| abc | Def | 100 | 09:00 | 09:01 | N |
| def | Ghi | 1100 | 09:45 | 09:50 | N |

Shortly after 10, an aggregation job that is executing can look for rows having status "N" (e.g., meaning "not merged"). The aggregation job can identify the time range for these rows and then process all other rows in this range as a batch. After the aggregation job is executed, the delta table rows that were processed can be marked with status "M" (e.g., meaning "merged"), as shown in the updated delta table (table 9):

TABLE 9

| | | Updated Delta Table | | | |
|---|---|---|---|---|---|
| COL1 | COL2 | KPI1 | TS (Data) | TS (Spark batch) | Status |
| abc | Def | 100 | 09:00 | 09:01 | M |
| def | Ghi | 1100 | 09:45 | 09:50 | M |

At this time the aggregate table can exist as

TABLE 10

| | | Aggregate Table | | |
|---|---|---|---|---|
| COL1 | COL2 | KPI1 | TS (bucket) | TS (agg time) |
| abc | Def | 100 | 09:00-09:59 | 10:01 |
| def | Ghi | 1100 | 09:00-09:59 | 10:01 |

At 10:05, if a late data entry reached the delta table, the aggregate job can delete the old data in the 09:00-09:59 range in the aggregate table (Table 12) and reprocess all rows in the delta table (Table 11) in the range 09:00-09:59:

TABLE 11

| | | Updated Delta Table | | | |
|---|---|---|---|---|---|
| COL1 | COL2 | KPI1 | TS (Data) | TS (Spark batch) | Status |
| abc | Def | 100 | 09:00 | 09:01 | M |
| def | Ghi | 1100 | 09:45 | 09:50 | M |
| aaa | aaa | 222 | 09:58 | 10:03 | N |

TABLE 12

| | | Updated Aggregate Table | | |
|---|---|---|---|---|
| COL1 | COL2 | KPI1 | TS (bucket) | TS (agg time) |
| abc | Def | 100 | 09:00-09:59 | 10:06 |
| def | Ghi | 1100 | 09:00-09:59 | 10:06 |
| aaa | aaa | 222 | 09:00-09:59 | 10:06 |

In some implementations, in order to manage the size of the delta table, a reasonable retention period can be specified so that if a late row arrives, the aggregation job can sees all relevant data in order to fully re-process the time bucket. For example, a reasonable retention period can be such that it's probably okay to delete time buckets in the delta table that have been aggregated and that are 12-24 hours old, as sensor data typically should not arrive after that time. To handle checkpoint recovery data replay (e.g., breaks of impotency), the "TS(Spark batch)" column can be maintained in the delta table (Table 11). During recovery, rows with the same batch TS are to be deleted, and not re-inserted if the rows already exist. After the data is replayed, the aggregation job can see the new rows and re-aggregate the entire time buckets.

In some implementations, orchestration can also use metadata caching. For example, the orchestration process would likely need access to several metadata objects, either for transformations or to control orchestration. These metadata objects may be volatile, which can require the use of mechanisms to check validity and maintain a consistent view of the objects. For example, the functionality can be similar to caches used in digital spaces.

Some implementations of systems that provide visualization can include, for example, "built-in" functionality. The built-in functionality can include, for example, application configuration access (e.g., including tried-and-tested spatial aggregation-related functionality) and rule engine application programming interfaces (APIs). The built-in functionality can also include capabilities for data matching use cases, e.g., for connecting to a CRM system in order to map one or more fields to an incoming stream data. If an instance (e.g., a Spark application instance) needs access to master data and/or metadata, a CUSTOM object can be implemented and supplied via a class. Table 13 (e.g., a cache objects table) defines available (and houses a manifest for) cached objects and their statuses:

TABLE 13

Cache Objects Table

| OBJECT ID | OBJECTNAME | OBJECT SOURCE | TYPE |
|---|---|---|---|
| obj1 | spatialIndex (spatial aggregation use case) | BUILTIN | transient |
| obj2 | Some.custom.scala.class | CUSTOM | static |
| obj3 | ingestconfiguration (general configuration) | BUILTIN | transient |
| obj4 | somethingfromCRMsystem (data matching use case) | BUILTIN | static |
| obj5 | thingtypedefinition (validate device messages) | BUILTIN | static |
| obj6 | dagconfigurationfromTRANSFORMATIONStable | BUILTIN | transient |

Cached objects identified in Table 13 may have various parameters and configurations, such as including a refresh interval. Such parameters and configuration can be included in metadata that is stored in a cached object properties table:

TABLE 14

Cache Object Properties Table

| OBJECTID | PARAMKEY | PARAMVALUE |
|---|---|---|
| obj1 | REFRESH_INTERVAL | 3600 |

Orchestration can also rely on general configuration information such as defined in the following configuration table that is accessible, for example, by applications:

TABLE 15

Configuration Table

| PARAMKEY | PARAMVALUE | PARAMTYPE |
|---|---|---|
| streaminginterval | 10 | Integer |
| Numpartitions | 4 | Integer |

The categories of views that are available to users can include spatial views. For example, spatial views can be generated from information included in a raw location stream accessed from storage or received in an actual live stream. Spatial metadata can be used to perform specialized spatial aggregations, such as aggregations that account for or use spatial hierarchies, dynamic aggregations (that occur in real-time based on data received), and other aggregations.

Aggregations can rely on machine-guided insights. For example, the machine-guided insights can include correlation which, when implemented as a transformation, can provide an output that is a simple view. Parameters for correlation can include, for example, partitions (e.g., optional list of attributes under which to execute independent correlations), inputs (e.g., identifying transformation inputs to generate a view), and outputs (e.g., including a list of partition attributes, attribute pair, and correlation values). Outputs can be defined, for example, in structures such as [partition_attribute, partion_attribute2, attributeA, attribute B, correlation].

Correlation views definitions can be pre-defined in metadata. In this way, runtime execution can periodically execute transformations to refresh the correlation data.

Another type of transformation is a clustering transformation. Parameters that are used in clustering transformations can include, for example, one or more lists of attributes to consider for clustering, typically including attributes that are numeric or that can be converted to numeric during execution. Parameters used in clustering transformation can also include output parameters, such as an update cluster column (e.g., defined in metadata and identifying a cluster number, a cluster center distance, and a confidence level) and cluster center information (e.g., generated and/or defined in a separate table and identifying a cluster center for that view (e.g., of format/content [ClusterID, CenterAttr1, CenterAttr2, . . . , user-defined label(s)]

Runtime execution of clustering transformations can include periodically executing clustering transformations/models to generate cluster information and including, for new data, predicting a cluster by calculating a distance from cluster centers. Clusters can be correlated to attributes and measures of the view generated by clustering.

Another type of transformation can result in large dataset visualizations. This type of visualization can be based on, for example, geo-spatial data, cluster events and states, summary and detail patterns (e.g., cluster visualization (summary) versus cluster representatives (detail)), drag-and-drop capabilities (e.g., used in dragging a cluster and dropping the cluster over a map to see spatial organization of clusters), automatic rule generation, incorporation of user feedback. User feedback can be received through user interfaces for collecting user inputs, both implicitly (e.g., based on user inputs) and explicitly (e.g., inferred based on user actions/inputs).

Views and Transformations can include, for example, geo-spatial views in which spatial data is generated by movement of things (e.g., the mobile assets 202 and the stationary assets 204). Geo-spatial views can provides spatial context to signals that are received from assets, such as IoT devices. Further, geo-spatial views can serve as an intermediary to other data, such as asset-non-specific, including weather, traffic conditions, and/or other information that be available for particular place or region. Dimensions for (e.g., information associated with) geo-spatial information include space (e.g., location, including latitude, longitude, elevation, names of regions, and/or other location information, an identification of an asset (e.g., a stationary asset), time-related information (e.g., a point in time or a time range), and identification of mobile assets Measures that are related to a particular area can include, for example, a number (e.g., indicating a presence) of assets at a location or in a region, and time spent at the location or in the region.

Transaction views that are based on geo-spatial information can be generated based on various sources of information, including received and ingested transaction data for assets captured through applications. Dimensions/information for each asset can include an identifier of the asset (e.g., the particular IoT thing), and a current time (or time range). Measures associated with each asset can include, for example, revenue, e.g., a revenue amount attributable to a time range or a cumulative revenue amount.

Another type of transformation can result in IoT signal views. For example, IOT signal views can be constructed from data generated by devices and sensors (e.g., signals from assets, or IoT things). Information included in IoT signal views can include an identifier of the asset (e.g., identifying the IoT thing), and a time constraint. Measures that are included in IoT signal views can include, for example, temperature, speed, or other measures. Views that can be derived from IoT signal views consider, for example, that connected goods must be able to leverage all of the data, the ability to easily produce new views out of existing ones, the ability to join views based on asset (e.g., IoT thing) and time, and the ability to align time axes (including, for example, when time axes are incompatible)

Figure 5:
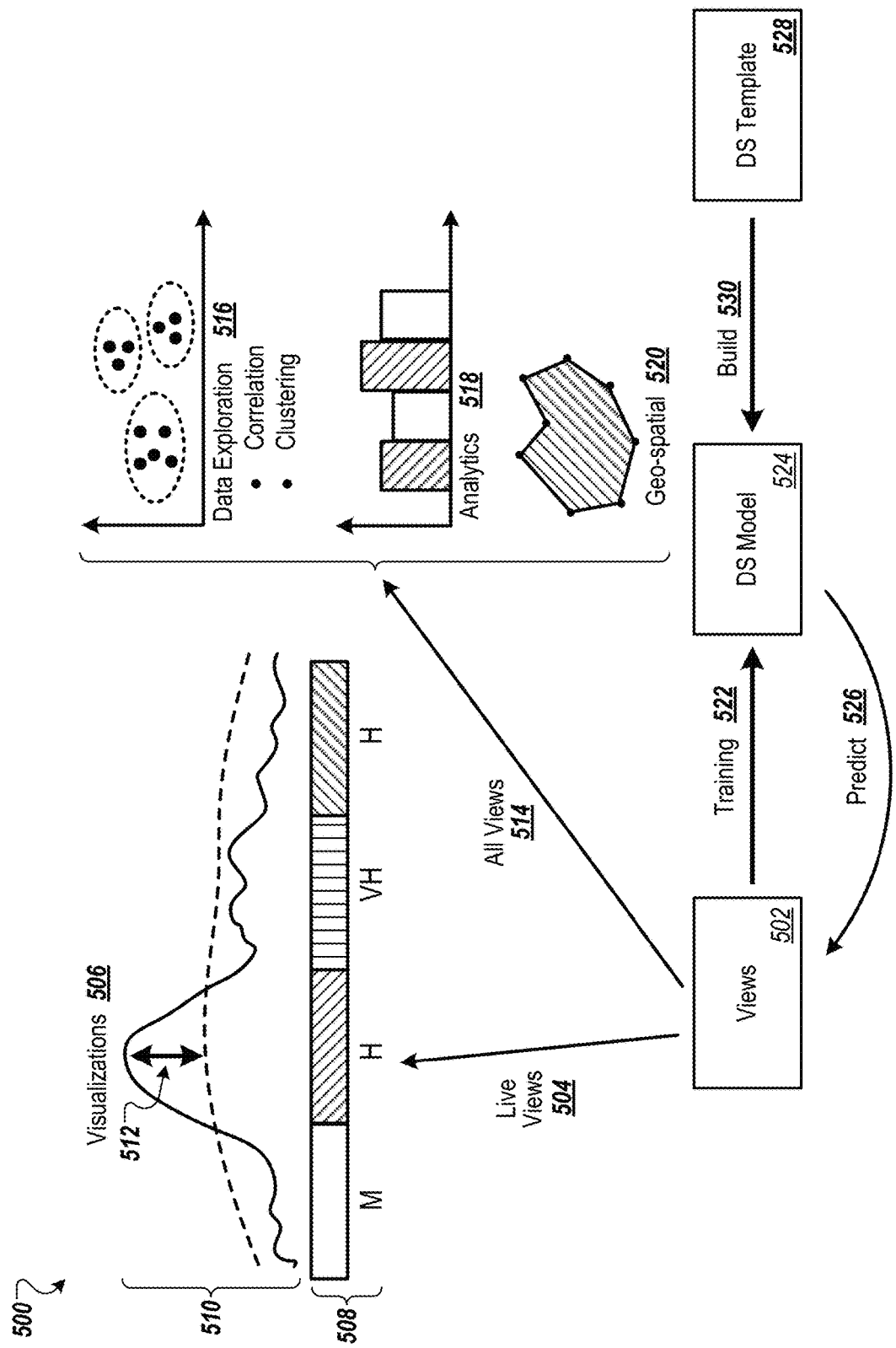
FIG. 5 is a diagram showing example consumption of views by various entities and applications.

FIG. 5 is a diagram showing example consumption 500 of views 502 by various entities and applications. For example, live views 504 can use historic data, and the views can be presented as visualizations 506 which can include one or more of bar charts 508, line graphs 510, and/or other types of presentations. Anomalies 512 can also be indicated, such as through different colors or styles of presentation, or by labeling. For example, if the line graph 510 is used to present temperature over time, the anomaly 512 can be identifies as a "very high" temperature reading that applies to one or more assets at a specific time or a range of times.

All views 514 (e.g., including live views 504 and past views) can be used to support various capabilities and functions, including data exploration 516 (e.g., correlation and clustering), analytics 518, and geo-spatial capabilities 520. Views 502 can be used to train (522) dataset models 524, which in turn can help to predict (526) views 502 in which a user is likely to be interested. Dataset templates 528 can be used to build (530) the dataset models 524.

In some implementations, a view can be represented as a table of rows, each row representing a data point (e.g., the information for a given vending machine), and each column representing a variable (e.g., revenue in the last 24 hours). Columns can be added to the table for conditions (e.g., that classify the data) and anomalies (e.g., that indicate whether or not an anomaly exists, based on the values in the row and optionally one or more conditions). Conditions can be numeric, Boolean, enumeration, or some other type of value, and groups of rows can each have a certain condition.

Figure 6:
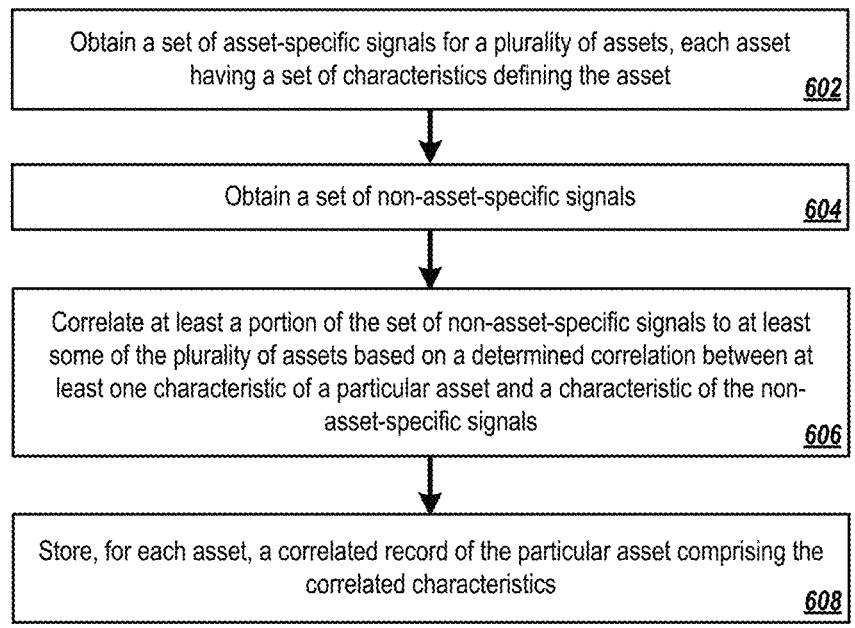
FIG. 6 is a flowchart of an example method for data collection and correlation of large numbers of assets.

FIG. 6 is a flowchart of an example method 600 for data collection and correlation of large numbers of assets. For clarity of presentation, the description that follows generally describes method 600 in the context of FIGS. 1A-5. For example, after a full context view (e.g., a flat matrix, as in FIG. 4) is generated, various pieces of information can be put together, including asset-specific signals and characteristics and related non-asset signals and characteristics. In addition, an anomaly condition (true or false) can be assigned to each record using a suitable machine learning model. A correlation can be calculated between an anomaly feature and at least a subset of other features in the full context view (e.g., using both signals and characteristics). A set features that have the most influence on the anomaly can be identified and sorted by correlation. Such features can be chosen to be displayed by default in views, thus providing a most insightful visual presentation to the user. In some implementations, correlation can be calculated using, for example, Pearson, Spearman, or other standard methods.

At 602, a set of asset-specific signals is obtained for a plurality of assets. The data collection and correlation engine 116, for example, can receive the asset-specific signals 118 associated with the assets 108. The asset-specific signals 118 can include, for each asset 108, a relative location, an absolute location, business data, model number, sensor information, and/or characteristics associated with a group of assets (including information for a model/part number/manufacture/class of asset). The asset-specific signals 118 can also include, for each asset 108, sensor readings, statuses (functioning/not, opened/closed), states, monitored data of the asset (e.g., sensor not included as part of the asset), a current location, a temperature, outside temperature (if monitored for that asset), messages, diagnostic codes, and/or power consumption. Each signal can have an associated timestamp, including a time when that the signal was received or a time (or time range) for which information in the signal represents. Alternatively, a timestamp can be assigned to signals as they are received if no timestamp is associated with the received signal. Since signals are received over time, such as in a time series, a series of data points corresponding to various points in time or intervals of time can be combined with other data points related to assets by matching times or time intervals. The matching can occur before or after transformations are performed on the data.

At 604, a set of non-asset-specific signals is obtained. The data collection and correlation engine 116, for example, can obtain the non-asset-specific signals 122 from external sources 124. For example, the non-asset-specific signals 122 can be related to a location or place (e.g., a city, state, region, specific building) such as weather conditions (e.g., current or forecast), current events (e.g., sports, politics, news events, stocks), social media information (e.g., social media posts, trends, product information (e.g., ratings, recalls), and other information. The non-asset-specific signals can be received, for example, when transmitted from the assets 108, or the non-asset-specific signals can be polled, for example, by the server 104 requesting information from the assets 108.

At 606, at least a portion of the set of non-asset-specific signals is correlated with at least some of the plurality of assets based on a determined correlation between at least one characteristic of a particular asset and a characteristic of the non-asset-specific signals. For example, the data collection and correlation engine 116 can correlate the asset-specific and non-asset-specific information, as described above. The correlation can occur, for example, by matching location information, asset identification information, timestamp information, and/or other information that can be used to link asset-specific and non-asset-specific information. Further, asset-specific information can be correlated with other asset-specific information, and non-asset-specific information can be correlated with other non-asset-specific information.

At 608, a correlated record of the particular asset comprising the correlated characteristics is stored for each asset. As an example, the data collection and correlation engine 116 can store the correlated information in the data store of correlated characteristics 130.

Characteristics of the asset, such as an IoT device, can include the asset's location. The asset can also be represented in one or more business transactions, such as customer resource management (CRM) systems. As an example, the asset can be a vending machine or a mobile vehicle (e.g., a food truck) that sells one or more specific products, and over time the CRM system can record information about transaction streams and revenue streams. This information can provide an opportunity for a time series of revenues to be correlated (e.g., merged) with time series sensor signals from assets. In some implementations, the method 600 can further include providing information for presenting, in a user interface, the correlated information.

For example, the user interface can provide an illustration of at least a subset of the assets in a map, presenting at least a portion of the correlated record at a location associated with the asset, such as a stationary location for the vending machine or a sales area for the mobile vehicle.

Figure 7:
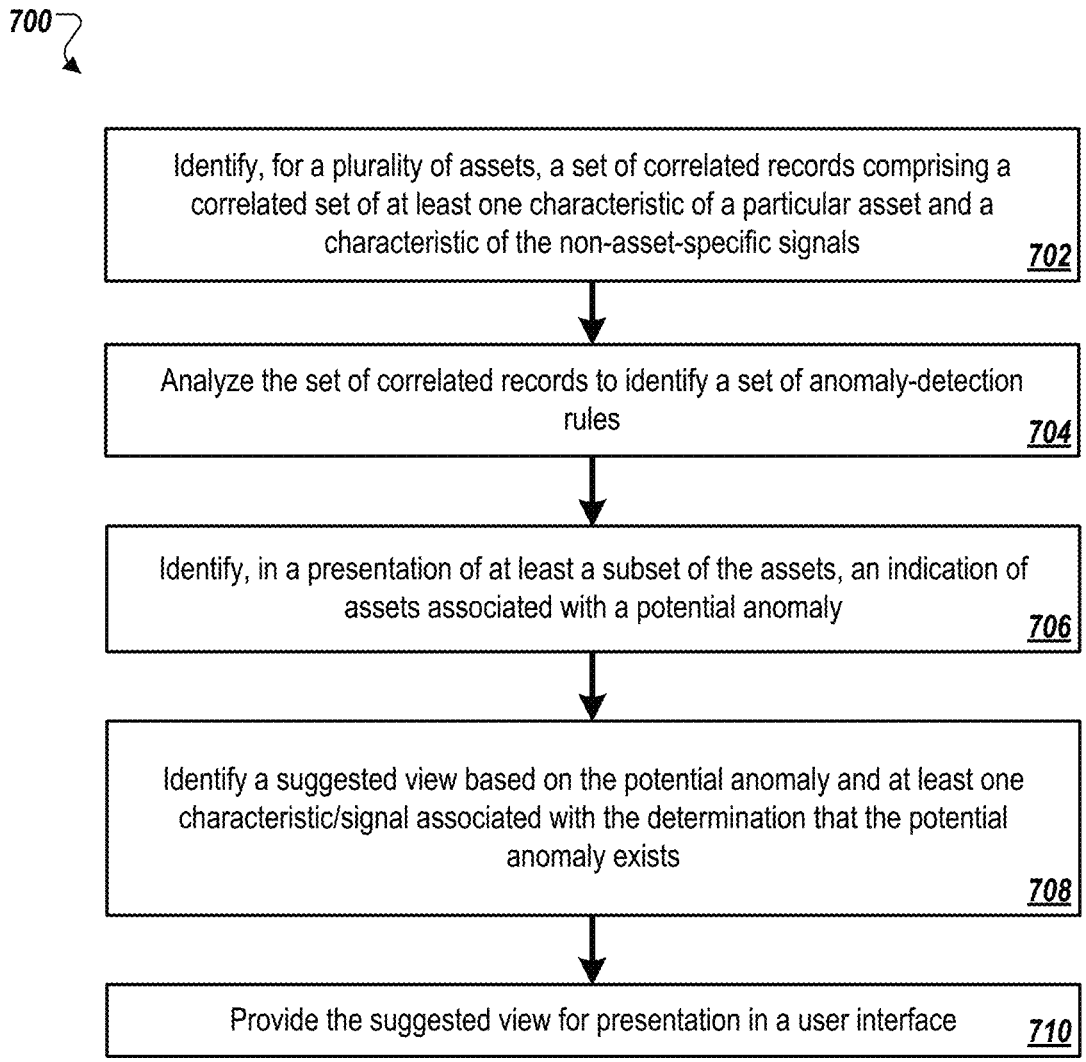
FIG. 7 is a flowchart of an example method for combining signals with geospatial and transactional data to generate view referred to in FIG. 8.
Figure 8:
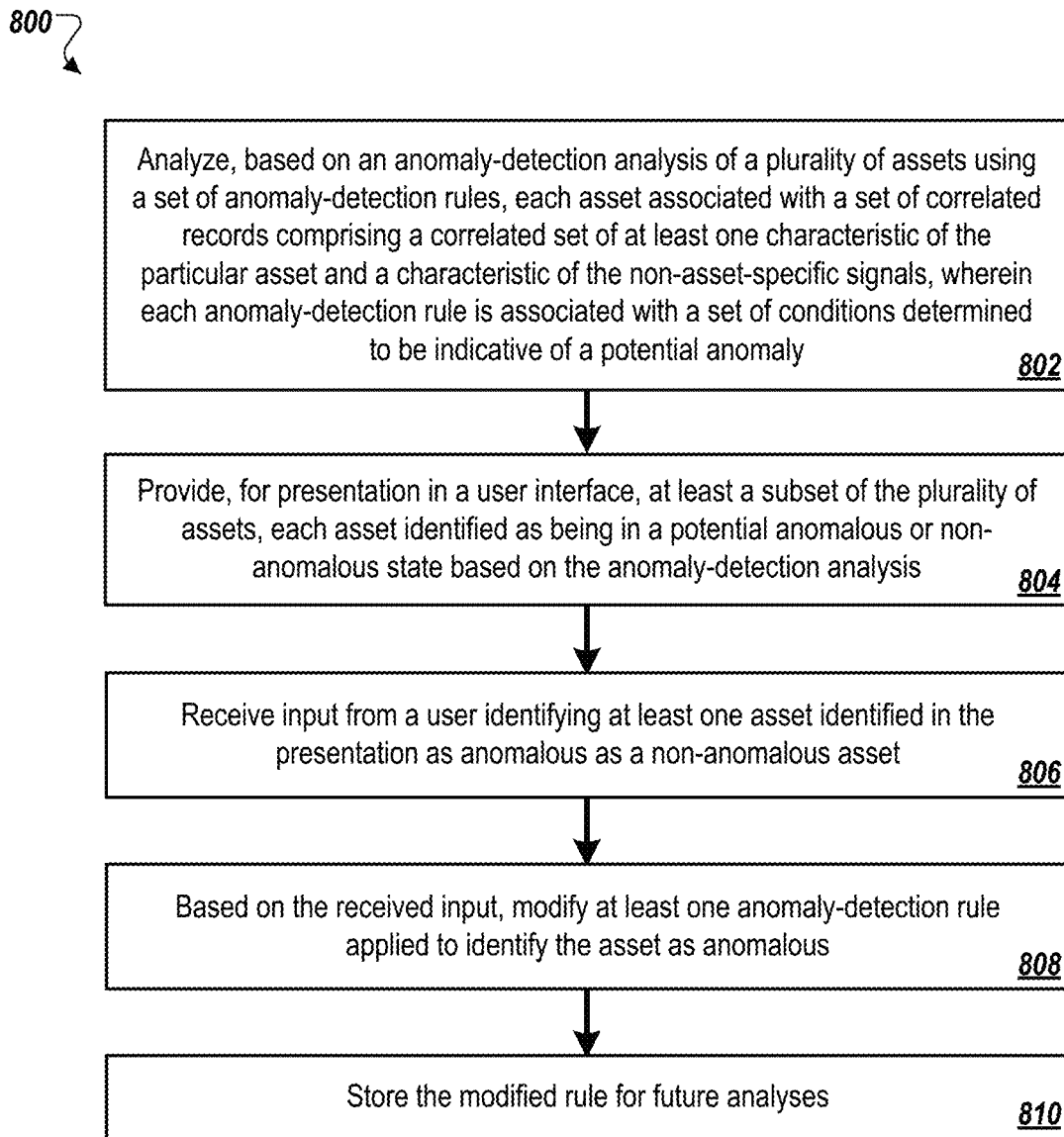
FIG. 8 is a flowchart of an example method for machine learning anomaly detection.

FIG. 7 is a flowchart of an example method 700 for combining signals with geospatial and transactional data to generate view referred to in FIG. 8. For clarity of presentation, the description that follows generally describes method 700 in the context of FIGS. 1A-5.

At 702, a set of correlated records is identified for a plurality of assets. The set of correlated records comprise a correlated set of at least one characteristic of a particular asset and a characteristic of the non-asset-specific signals. For example, the data collection and correlation engine 116 can receive and correlate the asset-specific signals 118 associated with the assets 108 and the non-asset-specific signals 122 received from the external sources 124. The correlated information can be stored, for example, in the data store of correlated characteristics 130.

At 704, the set of correlated records is analyzed to identify a set of anomaly-detection rules. For example, the analysis can be based on previously determined anomalies and machine learning to identify relevant or determinative sets of characteristics. The anomaly detection engine 142 can use information in the data store of correlated characteristics 130 to generate the anomaly detection rules 140. Generation of the anomaly detection rules 140 can be based, at least in part, on past information about anomalies. The past information can include, for example, information indicating when a particular set of characteristics indicates a confirmed (e.g., or very likely) anomaly exists and information indicating that a particular set of characteristics indicates that no anomaly exists.

At 706, an indication of assets associated with a potential anomaly is identified for presentation of at least a subset of the assets. For example, the anomaly detection engine 142 can prepare information identifying assets 108 for which an anomaly potentially exists along with information identified as to why (e.g., based on what specific current or past information the anomaly has been identified.

At 708, a suggested view is identified based on the potential anomaly and at least one characteristic/signal associated with the determination that the potential anomaly exists (based on the degree of correlation of the characteristic/signal to the anomaly). The view suggestion engine 132, for example, can identify a view that encompasses one or more assets 108 associated with the potential anomaly. The suggested view be a view that presents a line chart, a bar chart, a column chart, a pie chart, a graph, a map, or some combination of view types. The suggested view can include information on particular sets of assets and particular characteristics, such as information about temperature, revenue, power consumption, or some other data that triggered identification of the potential anomaly. The suggested view can be a product of plural transformations, including one or more transformations that are identified specifically for presenting information about the potential anomaly.

At 710, the suggested view is provided for presentation in the UI. The prepared information can be provided, for example, to the user 114 for presentation in the GUI 160. The suggested view in include color coding that helps to accentuate the one or more anomalies as well as to visually indicate different types of data. The suggested view can provide drill-down, hover, and other data discovery capabilities. The suggested view can be 1-, 2-, 3-, or 4-dimensional and can include multiple charts and information presentation areas, side-by-side. The suggested view can include filtering functions, such as to limit presentation of information by time, by region, by type of asset, or by combinations of filtering functions. The suggested view can provide clustering of information, such as based on a current view or zoom level. The suggested view can provide stackable layers of information, such as to allow the user 114 to remove information no longer of interest or to present additional information.

FIG. 8 is a flowchart of an example method 800 for machine learning anomaly detection. For clarity of presentation, the description that follows generally describes method 800 in the context of FIGS. 1A-5.

At 802, based on an anomaly-detection analysis of a plurality of assets using a set of anomaly-detection rules, each asset is analyzed that is associated with a set of correlated records comprising a correlated set of at least one characteristic of the particular asset and a characteristic of the non-asset-specific signals. Each anomaly-detection rule is associated with a set of conditions determined to be indicative of a potential anomaly. Potential anomalies can be identified, for example, from one or more values being outside a range or percentile. Identification can occur, for example, by looking at patterns, information associated with time-of-day or a day-of-week, or some other time-based comparison. Identification can occur, for example, by comparing a particular value with historic data from a previous similar period, such as last week's data, or last month's data, or the last time there was a storm. In some implementations, a given anomaly-detection rule can be associated with a set of conditions determined to be indicative of a potential anomaly. In some implementations, analysis of the asset can include the use of a suitable unsupervised machine learning model that detects anomalies. In some implementations, set of anomaly-detection algorithms can be applied on a given generated view (e.g., view 502 described above with reference to FIG. 5) to provide an additional feature. For example, the additional feature can be captured in and represented by a column in a table that represents the view, such as a column named "Anomaly" that holds the value of True (for anomalous data) or False (for normal data).

At 804, information for at least a subset of the plurality of assets is provided for presentation in a user interface. Each asset can be identified as being a potential anomalous or non-anomalous state based on the anomaly-detection analysis. For example, the potential anomalous or non-anomalous state can be associated with information presented to the user along the lines of, "X is happening and Y is in effect; is this an anomaly?"

At 806, input is received from a user identifying at least one asset identified in the presentation as anomalous as a non-anomalous asset. For example, the anomaly detection engine 142 can receive the user responses 146 indicating that the potential anomaly is not an anomaly at all, such as if the user 114 knows a valid reason for a value being out-of-range.

At 808, based on the received input, at least one of the particular anomaly-detection rules applied to identify the asset as anomalous is modified. For example, based on the user's response 146, the anomaly detection engine 142 can update the anomaly detection rules 140. Specifically, modifying the rule can be done by changing conditions associated with the anomaly detection rule, such as by loosening or tightening a test condition or a threshold for the rule.

At 810, the modified rule is stored for future analyses. For example, the anomaly detection engine 142 can store the updated rule in the anomaly detection rules 140.

Figure 9:
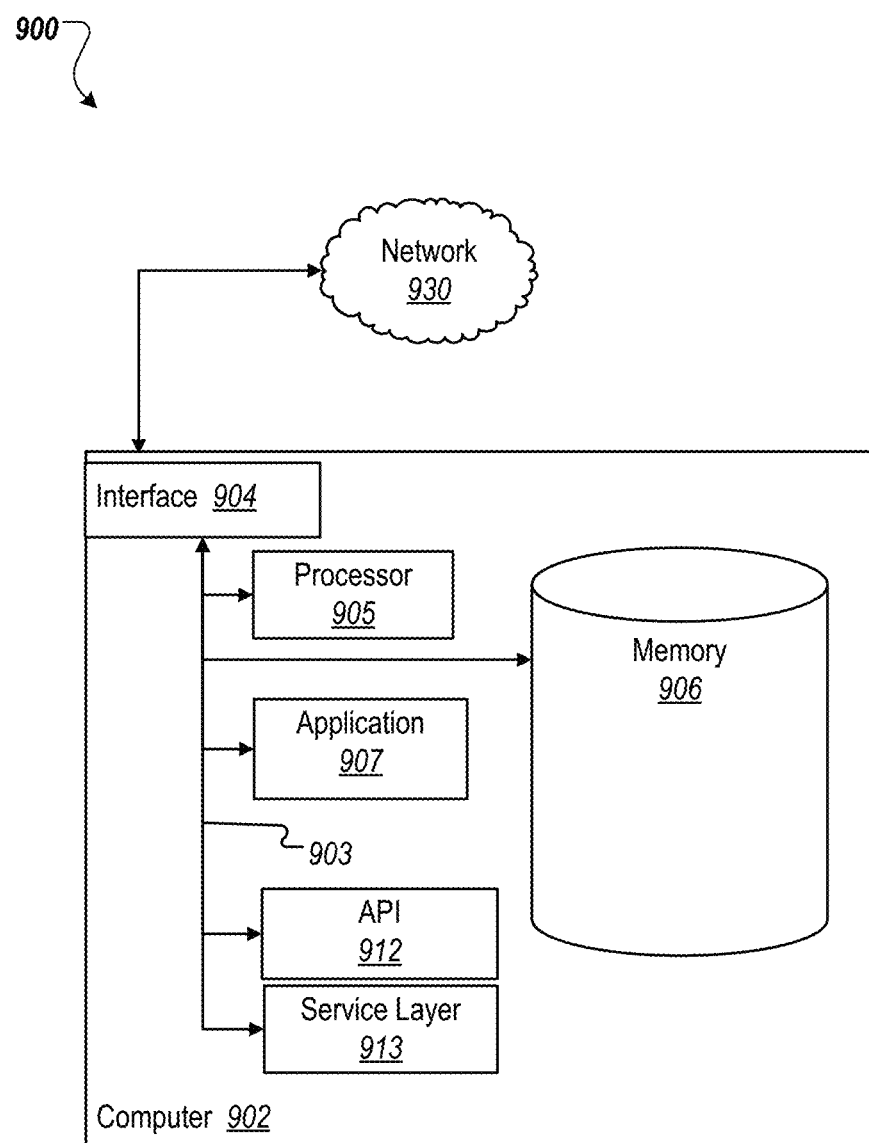
FIG. 9 is a block diagram of an exemplary computer system used to provide computational functionalities associated with described algorithms, methods, functions, processes, flows, and procedures as described in the instant disclosure.

FIG. 9 is a block diagram of an exemplary computer system 900 used to provide computational functionalities associated with described algorithms, methods, functions, processes, flows, and procedures as described in the instant disclosure.

The illustrated computer 902 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 902 may comprise a computer that includes an input device, such as a keypad, keyboard, touch screen, or other device that can accept user information, and an output device that conveys information associated with the operation of the computer 902, including digital data, visual, or audio information (or a combination of information), or a GUI.

The computer 902 can serve in a role as a client, network component, a server, a database or other persistency, or any other component (or a combination of roles) of a computer system for performing the subject matter described in the instant disclosure. The illustrated computer 902 is communicably coupled with a network 930. In some implementations, one or more components of the computer 902 may be configured to operate within environments, including cloud-computing-based, local, global, or other environment (or a combination of environments).

At a high level, the computer 902 is an electronic computing device operable to receive, transmit, process, store, or manage data and information associated with the described subject matter. According to some implementations, the computer 902 may also include or be communicably coupled with an application server, e-mail server, web server, caching server, streaming data server, business intelligence (BI) server, or other server (or a combination of servers).

The computer 902 can receive requests over network 930 from a client application (for example, executing on another computer 902) and responding to the received requests by processing the said requests in an appropriate software application. In addition, requests may also be sent to the computer 902 from internal users (for example, from a command console or by other appropriate access method), external or third-parties, other automated applications, as well as any other appropriate entities, individuals, systems, or computers.

Each of the components of the computer 902 can communicate using a system bus 903. In some implementations, any or all of the components of the computer 902, both hardware or software (or a combination of hardware and software), may interface with each other or the interface 904 (or a combination of both) over the system bus 903 using an application programming interface (API) 912 or a service layer 913 (or a combination of the API 912 and service layer 913). The API 912 may include specifications for routines, data structures, and object classes. The API 912 may be either computer-language independent or dependent and refer to a complete interface, a single function, or even a set of APIs. The service layer 913 provides software services to the computer 902 or other components (whether or not illustrated) that are communicably coupled to the computer 902. The functionality of the computer 902 may be accessible for all service consumers using this service layer. Software services, such as those provided by the service layer 913, provide reusable, defined business functionalities through a defined interface. For example, the interface may be software written in JAVA, C++, or other suitable language providing data in extensible markup language (XML) format or other suitable format. While illustrated as an integrated component of the computer 902, alternative implementations may illustrate the API 912 or the service layer 913 as stand-alone components in relation to other components of the computer 902 or other components (whether or not illustrated) that are communicably coupled to the computer 902. Moreover, any or all parts of the API 912 or the service layer 913 may be implemented as child or sub-modules of another software module, enterprise application, or hardware module without departing from the scope of the instant disclosure.

The computer 902 includes an interface 904. Although illustrated as a single interface 904 in FIG. 9, two or more interfaces 904 may be used according to particular needs, desires, or particular implementations of the computer 902. The interface 904 is used by the computer 902 for communicating with other systems in a distributed environment that are connected to the network 930 (whether illustrated or not). Generally, the interface 904 comprises logic encoded in software or hardware (or a combination of software and hardware) and operable to communicate with the network 930. More specifically, the interface 904 may comprise software supporting one or more communication protocols associated with communications such that the network 930 or interface's hardware is operable to communicate physical signals within and outside of the illustrated computer 902.

The computer 902 includes a processor 905. Although illustrated as a single processor 905 in FIG. 9, two or more processors may be used according to particular needs, desires, or particular implementations of the computer 902. Generally, the processor 905 executes instructions and manipulates data to perform the operations of the computer 902 and any algorithms, methods, functions, processes, flows, and procedures as described in the instant disclosure.

The computer 902 also includes a memory 906 that holds data for the computer 902 or other components (or a combination of both) that can be connected to the network 930 (whether illustrated or not). For example, memory 906 can be a database storing data consistent with this disclosure. Although illustrated as a single memory 906 in FIG. 9, two or more memories may be used according to particular needs, desires, or particular implementations of the computer 902 and the described functionality. While memory 906 is illustrated as an integral component of the computer 902, in alternative implementations, memory 906 can be external to the computer 902.

The application 907 is an algorithmic software engine providing functionality according to particular needs, desires, or particular implementations of the computer 902, particularly with respect to functionality described in this disclosure. For example, application 907 can serve as one or more components, modules, applications, etc. Further, although illustrated as a single application 907, the application 907 may be implemented as multiple applications 907 on the computer 902. In addition, although illustrated as integral to the computer 902, in alternative implementations, the application 907 can be external to the computer 902.

There may be any number of computers 902 associated with, or external to, a computer system containing computer 902, each computer 902 communicating over network 930. Further, the term "client," "user," and other appropriate terminology may be used interchangeably as appropriate without departing from the scope of this disclosure. Moreover, this disclosure contemplates that many users may use one computer 902, or that one user may use multiple computers 602.

In some implementations, components of the environments and systems described above may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, components may be adapted to execute any operating system, including Linux, UNIX, Windows, Mac OS®, Java™, Android™, iOS or any other suitable operating system. According to some implementations, components may also include, or be communicably coupled with, an e-mail server, a web server, a caching server, a streaming data server, and/or other suitable server(s).

Processors used in the environments and systems described above may be a central processing unit (CPU), an application specific integrated circuit (ASIC), a field-programmable gate array (FPGA), or another suitable component. Generally, each processor can execute instructions and manipulates data to perform the operations of various components. Specifically, each processor can execute the functionality required to send requests and/or data to components of the environment and to receive data from the components of the environment, such as in communication between the external, intermediary and target devices.

Components, environments and systems described above may include a memory or multiple memories. Memory may include any type of memory or database module and may take the form of volatile and/or non-volatile memory including, without limitation, magnetic media, optical media, random access memory (RAM), read-only memory (ROM), removable media, or any other suitable local or remote memory component. The memory may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, for references thereto associated with the purposes of the target, intermediary and external devices. Other components within the memory are possible.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. Software may instead include a number of sub-modules, third-party services, components, libraries, and such, as appropriate. Conversely, the features and functionality of various components can be combined into single components as appropriate.

Devices can encompass any computing device such as a smart phone, tablet computing device, PDA, desktop computer, laptop/notebook computer, wireless data port, one or more processors within these devices, or any other suitable processing device. For example, a device may comprise a computer that includes an input device, such as a keypad, touch screen, or other device that can accept user information, and an output device that conveys information associated with components of the environments and systems described above, including digital data, visual information, or a graphical user interface (GUI). The GUI interfaces with at least a portion of the environments and systems described above for any suitable purpose, including generating a visual representation of a web browser.

The preceding figures and accompanying description illustrate example processes and computer implementable techniques. The environments and systems described above (or their software or other components) may contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, processes may have additional operations, fewer operations, and/or different operations, so long as the methods remain appropriate.

In other words, although this disclosure has been described in terms of certain implementations and generally associated methods, alterations and permutations of these implementations, and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method comprising:
analyzing, by a machine learning model and based on an anomaly-detection analysis of a plurality of assets using a set of anomaly-detection rules, each particular asset associated with a set of correlated records comprising a correlated set of at least one characteristic of the particular asset and a characteristic of non-asset-specific signals, wherein each anomaly-detection rule is associated with a set of conditions determined to be indicative of a potential anomaly;
providing, for presentation in a user interface, at least a subset of the plurality of assets, each asset identified as being in a potential anomalous or non-anomalous state based on the anomaly-detection analysis, wherein for each asset identified as being in a potential anomalous state, a context is determined, the context including a machine-generated insight determined from: i) the at least one characteristic of the particular asset and ii) related business and external data associated with the particular asset;
identifying, a suggested view based on the context, wherein identifying the suggested view comprises:
determining, for a plurality of potential views, one or more dimensions to be presented;
determining, for each dimension, an amount of influence that dimension has on a presentation of the potential anomaly in the corresponding potential view based on the set of correlated records and a statistical correlation of the at least one characteristic of the particular asset and the potential anomaly; and
identifying the suggested view from the plurality of potential views by selecting a potential view which presents dimensions that have a maximum relative influence on the presentation of the potential anomaly;

providing, for each asset in a potentially anomalous state, the suggested view in the user interface based on the potential anomaly, the context, and at least one characteristic associated with a determination that the potential anomaly exists, wherein the suggested view provides drill-down capabilities to display additional asset specific information associated with the asset in a potentially anomalous state, the additional asset specific information not presented in dimensions of the suggested view;

receiving input from a user identifying at least one asset identified in the presentation as anomalous as a non-anomalous asset;

modifying, based on the received input, at least one anomaly-detection rule applied to identify the asset as anomalous; and storing the at least one modified rule for future analyses.

2. The computer-implemented method of claim 1, wherein the potential anomalies are identified from one or more value being outside of a range or a percentile.

3. The computer-implemented method of claim 1, wherein the potential anomalies are identified by looking at patterns, including time-of-day and day-of-week patterns.

4. The computer-implemented method of claim 1, wherein providing at least the subset of the plurality of assets includes providing predefined types of messages identifying information for the anomaly.

5. The computer-implemented method of claim 1, wherein each asset identified as being in a potential anomalous or non-anomalous state based on the anomaly-detection analysis.

6. The computer-implemented method of claim 1, wherein modifying the at least one anomaly-detection rule includes changing conditions associated with the anomaly-detection rule.

7. The computer-implemented method of claim 1, wherein modifying the at least one anomaly-detection rule occurs based on an statistical significance of inputs from plurality of users taking into account quality of their past direct inputs, and a quality of input from their organization.

8. The computer-implemented method of claim 1, wherein modifying the at least one anomaly-detection rule occurs after determining that the user has a role authorized for modification of the at least one anomaly-detection rule.

9. The computer-implemented method of claim 1, wherein an asset is an Internet of things (IoT) device.

10. A system comprising:
memory storing information about assets; and
a server performing operations comprising:
analyzing, by a machine learning model and based on an anomaly-detection analysis of a plurality of assets using a set of anomaly-detection rules, each particular asset associated with a set of correlated records comprising a correlated set of at least one characteristic of the particular asset and a characteristic of non-asset-specific signals, wherein each anomaly-detection rule is associated with a set of conditions determined to be indicative of a potential anomaly;

providing, for presentation in a user interface, at least a subset of the plurality of assets, each asset identified as being in a potential anomalous or non-anomalous state based on the anomaly-detection analysis, wherein for each asset identified as being in a potential anomalous state, a context is determined, the context including a machine-generated insight determined from: i) the at least one characteristic of the particular asset and ii) related business and external data associated with the particular asset;

identifying, a suggested view based on the context, wherein identifying the suggested view comprises:
determining, for a plurality of potential views, one or more dimensions to be presented;
determining, for each dimension, an amount of influence that dimension has on a presentation of the potential anomaly in the corresponding potential view based on the set of correlated records and a statistical correlation of the at least one characteristic of the particular asset and the potential anomaly; and
identifying the suggested view from the plurality of potential views by selecting a potential view which presents dimensions that have a maximum relative influence on the presentation of the potential anomaly;

providing, for each asset in a potentially anomalous state, the suggested view in the user interface based on the potential anomaly, the context, and at least one characteristic associated with a determination that the potential anomaly exists, wherein the suggested view provides drill-down capabilities to display additional asset specific information associated with the asset in a potentially anomalous state, the additional asset specific information not presented in dimensions of the suggested view;

receiving input from a user identifying at least one asset identified in the presentation as anomalous as a non-anomalous asset;

modifying, based on the received input, at least one anomaly-detection rule applied to identify the asset as anomalous; and storing the at least one modified rule for future analyses.

11. The system of claim 10, wherein the potential anomalies are identified from one or more value being outside of a range or a percentile.

12. The system of claim 10, wherein the potential anomalies are identified by looking at patterns, including time-of-day and day-of-week patterns.

13. The system of claim 10, wherein providing at least the subset of the plurality of assets includes providing predefined types of messages identifying information for the anomaly.

14. The system of claim 10, wherein each asset identified as being in a potential anomalous or non-anomalous state based on the anomaly-detection analysis.

15. The system of claim 10, wherein modifying the at least one anomaly-detection rule includes changing conditions associated with the anomaly-detection rule.

16. A non-transitory computer-readable media encoded with a computer program, the computer program comprising instructions that when executed by one or more computers cause the one or more computers to perform operations comprising:
analyzing, by a machine learning model and based on an anomaly-detection analysis of a plurality of assets using a set of anomaly-detection rules, each particular asset associated with a set of correlated records comprising a correlated set of at least one characteristic of the particular asset and a characteristic of non-asset-specific signals, wherein each anomaly-detection rule is associated with a set of conditions determined to be indicative of a potential anomaly;

providing, for presentation in a user interface, at least a subset of the plurality of assets, each asset identified as being in a potential anomalous or non-anomalous state based on the anomaly-detection analysis, wherein for each asset identified as being in a potential anomalous state, a context is determined, the context including a machine-generated insight determined from: i) the at least one characteristic of the particular asset and ii) related business and external data associated with the particular asset;

identifying, a suggested view based on the context, wherein identifying the suggested view comprises:
   determining, for a plurality of potential views, one or more dimensions to be presented;
   determining, for each dimension, an amount of influence that dimension has on a presentation of the potential anomaly in the corresponding potential view based on the set of correlated records and a statistical correlation of the at least one characteristic of the particular asset and the potential anomaly; and
   identifying the suggested view from the plurality of potential views by selecting a potential view which presents dimensions that have a maximum relative influence on the presentation of the potential anomaly;

providing, for each asset in a potentially anomalous state, the suggested view in the user interface based on the potential anomaly, the context, and at least one characteristic associated with a determination that the potential anomaly exists, wherein the suggested view provides drill-down capabilities to display additional asset specific information associated with the asset in a potentially anomalous state, the additional asset specific information not presented in dimensions of the suggested view;

receiving input from a user identifying at least one asset identified in the presentation as anomalous as a non-anomalous asset;

modifying, based on the received input, at least one anomaly-detection rule applied to identify the asset as anomalous; and storing the at least one modified rule for future analyses.

17. The non-transitory computer-readable media of claim 16, wherein the potential anomalies are identified from one or more value being outside of a range or a percentile.

18. The non-transitory computer-readable media of claim 16, wherein the potential anomalies are identified by looking at patterns, including time-of-day and day-of-week patterns.

19. The non-transitory computer-readable media of claim 16, wherein providing at least the subset of the plurality of assets includes providing predefined types of messages identifying information for the anomaly.

20. The non-transitory computer-readable media of claim 16, wherein each asset identified as being in a potential anomalous or non-anomalous state based on the anomaly-detection analysis.

* * * * *